US009911285B2

(12) United States Patent

Katz et al.

(10) Patent No.: US 9,911,285 B2
(45) Date of Patent: *Mar. 6, 2018

(54) SYSTEM FOR GAME PLAY IN ELECTRONIC ENVIRONMENT

(71) Applicant: MILESTONE ENTERTAINMENT LLC, Beverly Hills, CA (US)

(72) Inventors: Randall M. Katz, Beverly Hills, CA (US); Gary Dawson, Thousand Oaks, CA (US)

(73) Assignee: MILESTONE ENTERTAINMENT LLC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,376

(22) Filed: Apr. 13, 2017

(65) Prior Publication Data

US 2017/0221298 A1 Aug. 3, 2017

Related U.S. Application Data

(60) Continuation of application No. 13/794,045, filed on Mar. 11, 2013, now Pat. No. 9,626,837, which is a (Continued)

(51) Int. Cl.
*G06F 19/00* (2011.01)
*G07F 17/32* (2006.01)

(52) U.S. Cl.
CPC ........ *G07F 17/329* (2013.01); *G07F 17/3211* (2013.01); *G07F 17/3223* (2013.01); *G07F 17/3227* (2013.01)

(58) Field of Classification Search
None
See application file for complete search history.

(56) References Cited

U.S. PATENT DOCUMENTS 3,825,255 A 7/1974 Kennard et al.
3,873,092 A 3/1975 Fagan
(Continued)

FOREIGN PATENT DOCUMENTS

WO WO 99/11008 A2 3/1999
WO WO 01/03786 A1 1/2001
(Continued)

OTHER PUBLICATIONS

Finders Keepers, 1996 (retrieved from www.stewarttelevision.com on Feb. 25, 2004).

(Continued)

*Primary Examiner* — Paul A D'Agostino
(74) *Attorney, Agent, or Firm* — David B. Murphy; O'Melveny & Myers LLP

(57) ABSTRACT

The inventions herein relate to novel games of chance and apparatus and methods for their play. In certain embodiments, the existing lottery infrastructure is used in conjunction with electronic remote game play. A player receives a ticket identification number (TIN), optionally via lottery game play, and then plays an electronic game based upon the TIN. The remote system contains information associated with the TIN, for example, identification of which game will be played, and in a predetermined context, whether the player is to win or lose, and if they win, the form of the prize.

30 Claims, 18 Drawing Sheets

Related U.S. Application Data division of application No. 10/123,861, filed on Apr. 15, 2002, now Pat. No. 8,393,946, which is a continuation-in-part of application No. 09/965,620, filed on Sep. 26, 2001, now Pat. No. 6,811,484.

(56) References Cited

U.S. PATENT DOCUMENTS 4,348,027 A 9/1982 Escamilla-Kelly
4,582,324 A 4/1986 Koza et al.
4,772,025 A 9/1988 James et al.
4,836,546 A 6/1989 DiRe et al.
4,856,787 A 8/1989 Itkis
4,883,278 A 11/1989 Scott
4,943,090 A 7/1990 Fienberg
5,035,422 A 7/1991 Berman
5,046,737 A 9/1991 Fienberg
5,074,566 A 12/1991 Desbiens
5,112,050 A 5/1992 Koza et al.
5,116,049 A 5/1992 Sludikoff et al.
5,119,295 A * 6/1992 Kapur .................... A63F 3/081 379/93.13
5,157,602 A 10/1992 Fields et al.
5,158,293 A 10/1992 Mullins
5,256,863 A * 10/1993 Ferguson ............. G06Q 20/042 705/14.26
5,269,521 A 12/1993 Rossides
5,271,626 A 12/1993 Llenas et al.
5,317,135 A 5/1994 Finocchio
5,327,485 A * 7/1994 Leaden .................. G06Q 50/34 379/903
5,407,199 A 4/1995 Gumina
5,409,225 A 4/1995 Kelly et al.
5,409,234 A 4/1995 Bechter
5,417,424 A * 5/1995 Snowden ............... G06Q 50/34 273/139
5,472,196 A 12/1995 Rusnak
5,475,205 A 12/1995 Behm et al.
5,499,816 A 3/1996 Levy
5,513,852 A 5/1996 Robinson
5,518,253 A 5/1996 Pocock et al.
5,569,082 A 10/1996 Kaye
5,569,512 A 10/1996 Brawner et al.
5,580,311 A * 12/1996 Haste, III .............. A63F 3/0645 273/139
5,620,182 A 4/1997 Rossides
5,628,684 A * 5/1997 Bouedec ................. A63F 3/081 273/138.2
5,643,088 A 7/1997 Vaughn et al.
5,651,735 A 7/1997 Baba
5,655,961 A 8/1997 Acres et al.
5,685,541 A 11/1997 Lovell, Sr.
D387,390 S 12/1997 Seiler
5,697,844 A 12/1997 Von Kohorn
5,709,603 A 1/1998 Kaye
5,721,583 A 2/1998 Harada et al.
5,772,510 A 6/1998 Roberts
5,772,511 A 6/1998 Smeltzer
5,779,549 A 7/1998 Walker et al.
5,785,315 A 7/1998 Eiteneer et al.
5,791,990 A 8/1998 Schroeder et al.
5,795,228 A 8/1998 Trumbull et al.
5,813,913 A 9/1998 Berner et al.
5,816,575 A 10/1998 Keller
5,816,918 A 10/1998 Kelly et al.
5,842,921 A 12/1998 Mindes et al.
5,855,514 A 1/1999 Kamille
5,857,175 A 1/1999 Day et al.
5,871,398 A 2/1999 Schneier et al.
5,909,875 A 6/1999 Weingardt
5,916,024 A 6/1999 Von Kohorn
5,931,467 A 8/1999 Kamille
5,934,671 A 8/1999 Harrison
5,935,001 A 8/1999 Baba
5,936,661 A 8/1999 Trew
5,937,380 A 8/1999 Segan
5,949,042 A 9/1999 Dietz, II et al.
5,971,855 A 10/1999 Ng
6,012,983 A 1/2000 Walker et al.
6,015,344 A 1/2000 Kelly et al.
D420,057 S 2/2000 Colombo
6,024,640 A 2/2000 Walker et al.
6,024,641 A 2/2000 Sarno
6,048,268 A 4/2000 Humble
6,070,872 A 6/2000 Squitieri
6,077,163 A 6/2000 Walker et al.
6,080,062 A 6/2000 Olson
6,082,887 A 7/2000 Feuer et al.
6,086,477 A 7/2000 Walker et al.
6,102,395 A 8/2000 Such
6,102,400 A 8/2000 Scott et al.
6,168,521 B1 1/2001 Luciano et al.
6,193,610 B1 2/2001 Junkin
6,203,011 B1 3/2001 Nulph
6,234,896 B1 5/2001 Walker et al.
6,238,288 B1 5/2001 Walker et al.
6,240,555 B1 5/2001 Shoff et al.
6,241,246 B1 6/2001 Guttin et al.
6,241,606 B1 6/2001 Riendeau et al.
6,244,957 B1 6/2001 Walker et al.
6,250,685 B1 6/2001 Walker et al.
6,251,017 B1 6/2001 Leason et al.
D444,507 S 7/2001 Lundberg
6,267,376 B1 7/2001 Jenkins
6,267,670 B1 * 7/2001 Walker ................. G06Q 10/087 273/269
6,273,817 B1 8/2001 Sultan
6,273,820 B1 8/2001 Haste, III
6,277,026 B1 8/2001 Archer
RE37,371 E 9/2001 Gerow
6,290,600 B1 9/2001 Glasson
6,293,865 B1 9/2001 Kelly et al.
6,306,035 B1 10/2001 Kelly et al.
6,309,298 B1 10/2001 Gerow
6,312,334 B1 11/2001 Yoseloff
6,319,127 B1 11/2001 Walker et al.
6,322,446 B1 11/2001 Yacenda
6,354,593 B1 3/2002 Frommer et al.
6,373,462 B1 * 4/2002 Pan .......................... G09G 5/06 345/600
6,382,627 B1 5/2002 Lundberg
6,424,703 B1 7/2002 Katz
6,435,500 B2 8/2002 Gumina
6,443,452 B1 9/2002 Brune
6,443,840 B2 9/2002 Von Kohorn
6,446,964 B1 9/2002 Kelly et al.
6,454,648 B1 9/2002 Kelly et al.
6,475,085 B2 11/2002 Moody
6,488,280 B1 12/2002 Katz et al.
6,491,215 B1 12/2002 Irwin, Jr. et al.
6,497,408 B1 12/2002 Walker et al.
6,514,144 B2 2/2003 Riendeau et al.
6,547,242 B1 4/2003 Sugiyama et al.
6,565,084 B1 5/2003 Katz et al.
6,569,017 B2 5/2003 Enzminger et al.
6,602,135 B1 8/2003 Gerrard
6,607,439 B2 8/2003 Schneier et al.
6,634,942 B2 10/2003 Walker et al.
6,656,042 B2 12/2003 Reiss et al.
6,663,105 B1 12/2003 Sullivan et al.
6,676,522 B2 1/2004 Rowe et al.
6,699,124 B2 3/2004 Suchocki
6,749,198 B2 6/2004 Katz et al.
6,749,500 B1 6/2004 Nelson et al.
6,758,755 B2 7/2004 Kelly et al.
6,811,484 B2 11/2004 Katz et al.
6,824,469 B2 11/2004 Allibhoy et al.
6,875,110 B1 * 4/2005 Crumby .............. G07F 17/3202 463/42
6,888,929 B1 * 5/2005 Saylor ................... H04M 3/487 379/114.01
6,908,382 B2 6/2005 Walker et al.
6,939,229 B2 9/2005 McClintic
6,941,135 B2 9/2005 Minear et al.

(56) References Cited

U.S. PATENT DOCUMENTS 6,969,317 B2 11/2005 Walker et al.
6,988,732 B2 1/2006 Vancura
6,994,625 B2 2/2006 Falciglia, Sr.
7,008,317 B2 3/2006 Cote et al.
7,052,010 B2 5/2006 Katz et al.
7,054,928 B2 5/2006 Segan et al.
7,140,964 B2 11/2006 Walker et al.
7,156,739 B2 1/2007 Walker et al.
7,163,459 B2 1/2007 Tanskanen
7,181,690 B1 2/2007 Leahy et al.
7,186,180 B2 3/2007 Lathrop et al.
7,194,542 B2 3/2007 Segan et al.
7,204,756 B2 4/2007 Jubinville et al.
7,285,048 B2 10/2007 Karmarker
7,309,280 B2 12/2007 Toyoda
7,322,885 B1 1/2008 Luciano, Jr. et al.
7,331,860 B2 2/2008 Herrman et al.
7,357,715 B2 4/2008 Kane
7,374,484 B2 5/2008 Bennett, III
7,398,225 B2 7/2008 Voltmer et al.
7,404,764 B2 7/2008 Bozeman
7,422,213 B2 9/2008 Katz et al.
7,470,186 B2 12/2008 Cannon
7,510,116 B2 3/2009 Robb et al.
7,533,885 B2 5/2009 Nicely et al.
7,546,411 B2 6/2009 Bruner et al.
7,611,065 B2 11/2009 Behm et al.
7,621,810 B2 11/2009 Gilmore et al.
7,631,871 B2 12/2009 Bozeman
7,634,864 B2 12/2009 Segan et al.
7,645,194 B2 1/2010 Van Luchene
7,654,529 B2 2/2010 Rogers
7,662,038 B2 2/2010 Bozeman
7,666,082 B2 2/2010 Kane et al.
7,666,084 B2 2/2010 Herrmann et al.
7,666,095 B2 2/2010 Van Luchene
7,686,691 B2 3/2010 Van Luchene
7,690,996 B2 4/2010 Iddings et al.
7,716,126 B2 5/2010 France et al.
7,726,652 B2 6/2010 Jubinville et al.
7,734,251 B1 6/2010 Harvey et al.
7,749,066 B2 7/2010 Hartman et al.
7,749,081 B1 7/2010 Acres
7,753,772 B1 * 7/2010 Walker .................... A63F 13/12 273/138.1
7,753,774 B2 7/2010 Gail et al.
7,753,789 B2 7/2010 Walker et al.
7,756,742 B2 7/2010 Gilmore et al.
7,766,739 B2 8/2010 Kane et al.
7,766,740 B2 8/2010 Penrice
7,771,264 B2 8/2010 Kane et al.
7,785,193 B2 8/2010 Paulsen et al.
7,785,195 B2 8/2010 Palmer et al.
7,794,324 B2 9/2010 White et al.
7,797,717 B1 9/2010 Harvey et al.
7,798,896 B2 9/2010 Katz et al.
7,815,502 B2 10/2010 Hardy et al.
7,819,747 B2 10/2010 Kane et al.
7,860,131 B1 12/2010 Harvey et al.
7,871,327 B2 1/2011 Walker et al.
7,874,914 B2 1/2011 Walker et al.
7,896,735 B2 3/2011 Kelly et al.
7,908,638 B1 3/2011 Harvey et al.
7,914,374 B2 3/2011 Walker et al.
7,918,736 B2 4/2011 Walker et al.
7,922,587 B2 4/2011 Chun
7,934,986 B2 5/2011 Kane et al.
7,945,856 B2 5/2011 Leahy et al.
7,955,169 B2 6/2011 Walker et al.
7,959,502 B2 6/2011 Kane et al.
7,967,292 B2 6/2011 Katz et al.
7,976,374 B2 7/2011 Kane et al.
7,980,942 B2 7/2011 Kane et al.
7,988,551 B2 8/2011 Walker et al.
8,002,630 B2 8/2011 Nguyen et al.
8,012,013 B2 9/2011 Walker et al.
8,016,668 B2 9/2011 Hardy et al.
8,025,567 B2 9/2011 Kane et al.
8,029,361 B2 10/2011 Hardy et al.
8,038,529 B2 10/2011 Kane et al.
8,046,256 B2 10/2011 Chien et al.
8,047,907 B2 11/2011 Kane et al.
8,075,386 B1 12/2011 Leake
8,075,387 B2 12/2011 Meyer et al.
8,082,501 B2 12/2011 Leahy et al.
8,083,583 B2 12/2011 Bennett, III et al.
8,109,828 B2 2/2012 Kane et al.
8,118,660 B2 2/2012 Pace
8,133,113 B2 3/2012 Nguyen et al.
8,137,178 B2 3/2012 Lind et al.
8,147,325 B2 4/2012 Kane et al.
8,157,630 B2 4/2012 Herrmann et al.
8,206,210 B2 6/2012 Walker et al.
8,241,100 B2 8/2012 Katz et al.
8,241,110 B2 8/2012 Katz et al.
8,287,351 B2 10/2012 Boykin et al.
8,290,816 B2 10/2012 Whiteman et al.
8,308,162 B2 11/2012 Rogers
8,342,959 B2 1/2013 Mahaffey et al.
8,376,826 B2 2/2013 Katz et al.
8,393,946 B2 3/2013 Katz et al.
8,425,297 B2 4/2013 Kane et al.
8,425,300 B2 4/2013 Kane et al.
8,460,081 B2 6/2013 Meyer
8,529,336 B2 9/2013 Katz et al.
8,535,134 B2 9/2013 Katz et al.
8,626,582 B2 1/2014 Ariff et al.
8,696,431 B2 4/2014 Safaei et al.
8,696,432 B2 4/2014 Kane et al.
8,708,814 B2 4/2014 Kane et al.
8,727,853 B2 5/2014 Katz et al.
8,727,867 B2 5/2014 Kane et al.
8,764,543 B2 7/2014 Houle et al.
8,794,630 B2 8/2014 Katz et al.
8,795,071 B2 8/2014 Katz et al.
8,808,080 B2 8/2014 Meyer
9,280,875 B2 3/2016 Pincus et al.
9,508,225 B2 11/2016 Katz et al.
9,626,837 B2 4/2017 Katz et al.
2002/0037766 A1 * 3/2002 Muniz ..................... A63F 3/081 463/17
2002/0069265 A1 * 6/2002 Bountour ............... H04N 7/181 709/219
2002/0094869 A1 7/2002 Harkham
2002/0119824 A1 8/2002 Allen
2002/0137217 A1 * 9/2002 Rowe ...................... A63F 13/12 436/42
2002/0142815 A1 * 10/2002 Candelore .......... H04N 21/4784 463/1
2002/0165020 A1 * 11/2002 Koyama ............. G07F 17/3262 463/17
2002/0165025 A1 * 11/2002 Kawahara ............. G06Q 30/02 463/41
2000/0187825 12/2002 Tracy et al.
2002/0187825 A1 * 12/2002 Tracy .................... G07F 17/329 463/17
2003/0023547 A1 * 1/2003 France ................... G06Q 20/10 705/39
2003/0045340 A1 3/2003 Roberts
2003/0104868 A1 6/2003 Okita et al.
2003/0189288 A1 10/2003 Katz et al.
2005/0096117 A1 5/2005 Katz et al.
2005/0250569 A1 11/2005 Kane et al.
2006/0025197 A1 2/2006 Kane et al.
2006/0105837 A1 5/2006 Walker et al.
2006/0111168 A1 * 5/2006 Nguyen .................. G07F 17/32 463/16
2006/0217188 A1 9/2006 Walker et al.
2006/0248025 A1 11/2006 Walker et al.
2006/0251383 A1 11/2006 Vronay et al.
2007/0093296 A1 * 4/2007 Asher .................. G06Q 20/102 463/42

(56) References Cited

U.S. PATENT DOCUMENTS

| | | | | |
|---|---|---|---|---|
| 2007/0129144 | A1* | 6/2007 | Katz | G07F 17/32 463/30 |
| 2007/0259710 | A1 | 11/2007 | Walker et al. | |
| 2008/0009340 | A1 | 1/2008 | Walker et al. | |
| 2008/0146337 | A1* | 6/2008 | Halonen | G07C 15/006 463/42 |
| 2008/0248865 | A1* | 10/2008 | Tedesco | G07F 17/3248 463/25 |
| 2009/0011812 | A1 | 1/2009 | Katz et al. | |
| 2009/0061980 | A1 | 3/2009 | Holton et al. | |
| 2009/0117966 | A1 | 5/2009 | Rogers et al. | |
| 2009/0228351 | A1* | 9/2009 | Rijsenbrij | G06Q 20/102 705/14.14 |
| 2009/0270155 | A1 | 10/2009 | Glass et al. | |
| 2010/0227675 | A1 | 9/2010 | Luxton et al. | |
| 2011/0218025 | A1 | 9/2011 | Katz et al. | |
| 2011/0269533 | A1 | 11/2011 | Kelly et al. | |
| 2013/0045784 | A1 | 2/2013 | Napolitano | |
| 2014/0155132 | A1 | 6/2014 | Katz et al. | |
| 2014/0155133 | A1 | 6/2014 | Katz et al. | |
| 2014/0243066 | A1 | 8/2014 | Coutts | |
| 2015/0099565 | A1 | 4/2015 | Katz et al. | |
| 2016/0008707 | A1 | 1/2016 | Katz et al. | |
| 2016/0012680 | A1 | 1/2016 | Katz et al. | |
| 2017/0069163 | A9 | 3/2017 | Katz et al. | |
| 2017/0076534 | A1 | 3/2017 | Katz et al. | |

FOREIGN PATENT DOCUMENTS

| | | | |
|---|---|---|---|
| WO | WO 01/42968 | A1 | 6/2001 |
| WO | WO 01/76704 | A2 | 10/2001 |

OTHER PUBLICATIONS

IGDA Online Games White Paper, Full Version, presenting at the Game Developers Conference 2002, pp. title, i-iv, 1-63.

IGDA Online Games White Paper, 2nd edition, Mar. 2003, pp. 1-140.

IGDA Web and Downloadable Games White Paper, presented at the Game Developers Converence 2004 by the IGDA Online Games SIG, pp. 1-93.

IGDA 2004 Persistent Worlds Whitepaper, presented by the IGDA Online Games SIG, pp. 1-82.

IGDA 2005 Casual Games White Paper, pp. 1-125.

IGDA Mobile Games White Paper, presented at the Game Developers Conference 2005 by the IGDA Online Games SIG, pp. 1-55.

Top That II, 1996 (retrieved from www.stewarttelevision.com on Feb. 25, 2004).

$10,000 Championship, one version for $50,000 broadcast in 1996 (retrieved from www.stewarttelevision.com on Feb. 25, 2004).

Schwartz, et al.., “The Encyclopedia of TV Game Shows, 3rd” Edition, 1999, pp. 22-23, 48-49, 90, 98-99, 176-180.

www.geocities.com/TelevisionCity/1856/rules.htm, Card Sharks, Apr. 24, 1978, 1-3.

* cited by examiner

10

Fig. 3
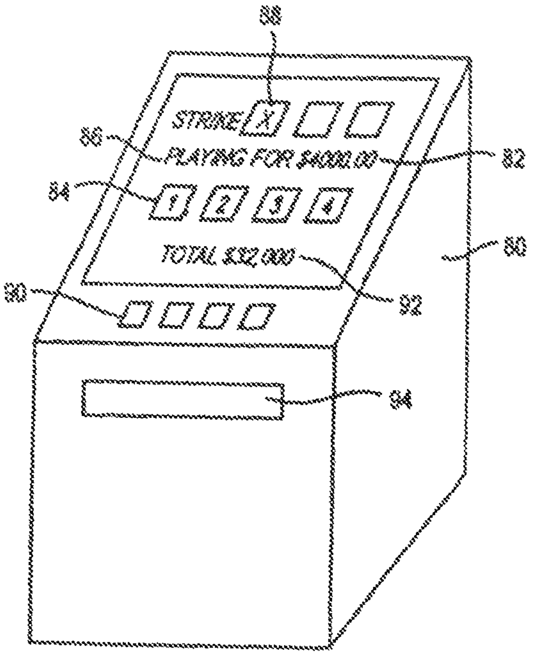
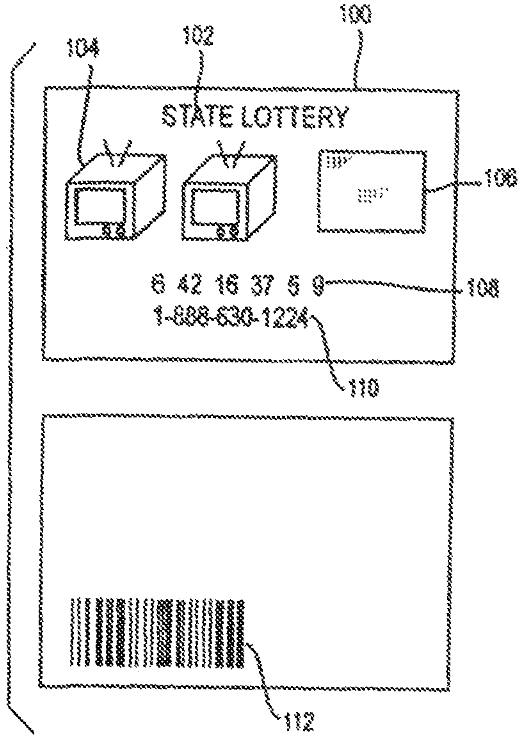
Fig. 4
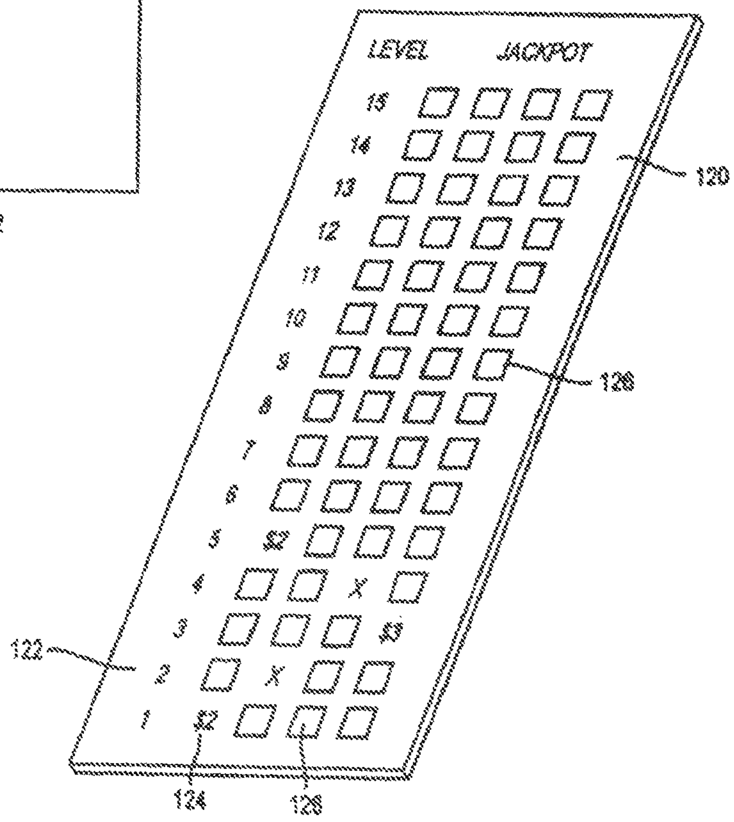
Fig. 5

Match Game in a minute

What's the game fellas?

- Studio contestant is asked a series of "Super Match" questions against the clock as a "stake-setter"
- Contestants are paid off for each #1, #2, or #3 answer they give
- Only home players that answer the same as contestant remain in the game. Others are eliminated as we play
- At the end of the time, the contestant can keep their money or try to multiply it by 5
- To win, we randomly pick a home player and the contestant must match the player in a "Head to Head" match

FIG. 10

FIG. 17
WELCOME TO
LOTTERY.COM
Registered Users
User ID:
Enter Ticket identification Number Here
Password:
Not Registered?
Register Now

| TIN Number | Game | Prize Amount | Non-Monetary Prize | Last Date to Play | Game Play Required to Reveal Prize? |
|---|---|---|---|---|---|
| 65432981 | Hut Seat | $1,000.00 | | 05/03/02 | Yes |
| 65432982 | JACKO | $50.00 | | 04/23/02 | No |
| 65432983 | LOTO | $500.00 | | Open | Yes |
| 65432984 | LOTO | 0 | Free Play | Open | Yes |
| | | | | | |

FIG. 18A

| Vending Merchant | Personalized Retail Coupons | Cross-Promotion | User ID | Password or PIN |
|---|---|---|---|---|
| 7-11, Chatsworth & Main | 7-11 | Coke | Lotoman26 | 123456 |
| 7-11, Chatsworth & 5th | 7-11 | Pepsi | None | None |
| Ralph's, Century City, CA | Ralphs | None | Scratchem | 4327 |
| 7-11, Chatsworth & Main | 7-11 | Coke, 30% Discount | None | None |

FIG. 18B

| Link to Other Game | Date of Play | Time of Play | Sequence Number | # of Plays Allowed |
|---|---|---|---|---|
| www.coke.com/game | 04/22/02 | 13:23:32 | 6354 | 3 |
| none | 04/21/02 | 12:15:10 | 63 | 1 |
| www.xgames.com | 04/14/02 | 09:33:41 | 1324 | 1 |
| none | 04/23/02 | 10:15.13 | 1325 | 1 |
| | | | | |

FIG. 18C

| Citizenship Information | Computer Address | E-mail Address | Physical Address | Registered Frequent Player |
|---|---|---|---|---|
| 469384323FR | 1324597223 | jami@hotmail.com | 3 rue de la Seine Paris, FR | yes |
| 3555462NL | 3968736293 | FRStone@aol.com | unknown | no |
| SSN 564-35-1283 | 6945112442 | unknown | unknown | no |
| SSN 523-25-3232 | 6978854645 | dons@earthlink.et | 1243 Main St. Yuba, CA 91331 | Yes |

FIG. 18D

| Frequent Player Points | Form of Compensation | Acknowledgment Number |
|---|---|---|
| 13244 | Cash | 4220263541000coke |
| 0 | Airline Miles | 164777538865 |
| 0 | Further Game Play | 164777538866 |
| 103 | Cash | 164777538867 |
| | | |

FIG. 18E

*Affirmative Game Play Required Before Redemption is Possible

| Authorized Retailer/ Redemption Location | User Remote Game Play | Game Play Server (e.g., webserver) | Lottery System |
|---|---|---|---|
| Obtain Base Game Ticket | | | |
| | Begin Game Enter # | | |
| | | Determine if # is Win/Loss if Win, Amount of Win Update Record Indicating Game Play Occurred | |
| | Display "Win/Lose" and if Win, Amount to Player | | |
| Player provides Ticket to Authorized Redemption Location | | | |
| Redemption Location Confirms Game Play | | | |
| | | | System Confirms Game Play |
| Prize Paid | | | |

FIG. 19

SYSTEM FOR GAME PLAY IN ELECTRONIC ENVIRONMENT

PRIORITY CLAIM AND RELATED CASES

This application is a continuation of U.S. patent application Ser. No. 13/794,045, filed Mar. 11, 2013, issued as U.S. Pat. No. 9,626,837 on Apr. 18, 2017, which is a divisional of U.S. patent application Ser. No. 10/123,861, filed Apr. 15, 2002, issued as U.S. Pat. No. 8,393,946 on Mar. 12, 2013, which is a continuation-in-part of U.S. patent application Ser. No. 09/965,620, filed Sep. 26, 2001, issued as U.S. Pat. No. 6,811,484 on Nov. 2, 2004. This application is also related to application Ser. No. 09/672,179, filed Sep. 27, 2000, issued as: U.S. Pat. No. 6,488,280 on Dec. 3, 2002, and application Ser. No. 09/585,987, filed Jun. 2, 2000, issued as U.S. Pat. No. 6,565,084 on May 20, 2003, which are all hereby expressly incorporated by reference in their entirety as if fully set forth herein.

FIELD OF THE INVENTION

These inventions relate to methods, an apparatus for their implementation, of unique player participation games, and for improved methods of play for games of chance. More particularly, these inventions relate to new and improved games involving player participation in a broadcast medium, such as television, and in other communication media, such as over the Internet or other communications network.

BACKGROUND OF THE INVENTION

Player participation games fall broadly under the categories of games of chance and games of skill. One of the main forms of games of chance is lotteries, which by definition, involve the three elements of: 1) prize, 2) chance and 3) consideration. If these three elements are present, then the game is considered to be a lottery, and is typically then run by a governmental entity. In the United States, lotteries are typically run by the individual states, or collectively by a group of states. In other countries, it is typically the national government that runs the lottery. Countries and states attempt to strictly limit the game play to their geographic boundaries. For example, in Austria, while electronic access to the game may be available over the Internet, or in order to play, the person must have a bank account in Austria, and be able to navigate the non-English menu.

Games have been conducted in any of a number of formats. Certainly, live, in person games have been performed. Yet other games have been played and broadcast over a broadcast medium, such as radio or television. Yet other games have been played through active communication media, such as the telephone, or over a communication network such as the Internet.

Various attempts have been made to provide game play over the Internet. By way of example, the game show Jeopardy has been placed on the web at http://www.sony-.com.

Various other attempts have been made to extend the general concept of gambling to broad communication media, such as the Internet. For example, U.S. Pat. No. 5,800,268 entitled, "Method of Participating in a Live Casino Game from a Remote Location" has been asserted in a litigation in against an off shore corporation. The '268 patent discloses a system in which a player may participate in a live casino game from a location remote from the casino. A player interface station, such as a computer terminal or other special input device, is connected by a communication line to the casino. A second communication line is established from the casino to the player's financial institution. The player is presented with an image of an actual "live" game. The player then participates directly as if they were physically present at the casino. A wager is cleared with the player's financial institution to insure adequate resources to cover the bet.

U.S. Pat. No. 4,845,739 to Ronald A. Katz is entitled, "Telephonic—Interface Statistical Analysis System". The patent describes various operating formats, including a format to be performed in association with television media. Specifically, in one embodiment, a real-time format is provided in which television viewers participate on a real-time basis in a game show for prizes. Expanded audience participation is achieved. Various levels of qualification are provided, such as for a child's television game format is utilized, parental clearance may be required. The use of personal identification numbers (pin numbers) is disclosed. In one implementation, the caller is prompted to identify which of the actual studio of audience participants the caller will be aligned with. Additionally, the caller may be instructed to indicate the extent of a wager. As the game progresses, the individual player's accounts are credited or debited, thereby providing on-going accounting data. In yet another implementation, a non real-time operation is provided. Such a show might involve a quiz for callers based on their ability to perceive and remember occurrences within the show. Pre-registration is optionally utilized. In this implementation, a sequence or time clock would be utilized in order to limit or control individual interfaces to a specific time or geographic "window". In this way, the caller questions eon be utilized across various time zones without the caller having obtained the question earlier than other callers within a given time zone.

Berman, U.S. Pat. No. 5,108,115 discloses a game show and method entitled "Interactive Game Show and Method for Achieving Interactive Communication Therewith". An interactive communication system is provided which permits individuals to electronically select at least one possible outcome of a plurality of outcomes of a future event. Successful contestants possibly share in a prize which is associated with the event. A home audience of a televised game show may electronically communicate a series of random numbers using their touch tone telephone to participate in the show.

Recently, various governmental entities and trade organizations have addressed the issue of game play over the Internet. Senator Kyl has introduced a bill which would preclude the offering of Internet based gaming, though permitting states to offer Internet gambling. Consideration has been given to requiring that the states sponsored gaming be limited to an Intranet, in an effort to limit those participating to persons physically resident within the states boundaries. Various international lottery organizations have promoted similar restrictions, namely, precluding the individuals offering of games of chance, and reserving that option exclusively to the state.

Various lottery formats are known to the art. In one classic format, a pre-determined number of tickets are provided with certain printed matter, such as numbers Or other indicia, where the information is then obscured by a scratch-off layer. By removing the layer and revealing the underlying information, the ticket holder may determine whether they have won or not. Various extensions have been made to a "virtual" scratch-off ticket where no physical product is provided.

A conventional lottery proceeds as follows. First, a series of numbers are selected, either by the player or by some automated selection system, such as by computer. Upon the occurrence of a pre-determined event, such as on a set date and time, numbers are randomly chosen. Both mechanical methods, such as selection of ping-pong balls bearing numeric designations, or electronic means such as through a random number generator, may be utilized. The selected numbers are then provided to the participants, such as through a broadcast medium like newspapers, radio and television. Finally, the holder or holders of winning the tickets then present their ticket for payment.

In yet another aspect of game play, a typical television presented game show lasts on the order of one half hour. Various shorter format games or shows have been utilized, for example, a football based advertisement of game has been presented by IBM during televised football games under the name "you make the call". Yet other shorter version games have been presented over web TV or on the game show network.

The television game show "Who Wants to be a Millionaire" is believed to have originated in Britain, and has become extremely popular in the United States. The game is a trivia game. While being principally a game of skill, the nature of the questions, or the contestants' knowledge of the potential answers, makes the game at times a guessing game or game of chance. The format consists of one contestant and one host. The contestant is presented with a question and four possible answers. If the contestant answers the question correctly, they advance to a next level, each level being associated with a higher monetary prize amount, which is roughly twice the amount of the preceding level. A contestant is given three "life lines": a "50/50" where in two incorrect answers are removed, thereby leaving the correct answer and one incorrect answer, the "phone a friend", wherein the contestant may call a friend by telephone and solicit their response to the question, subject to a 30 second time limit, and an "ask the audience" option where the audience is polled regarding their view of the correct answer to the question. Various safe levels are established, such as at $1,000.00 such that the contestant would be awarded that amount of money in the even that they fail to correctly answer a question. Finally, after a question is posed, the contestant may elect to discontinue play, and to receive that amount of money won at the preceding level.

Various proposals have been made to extend the game play experience, particularly in a scratch-off lottery environment. For example, in Kaye, U.S. Pat. No. 5,569,082, entitled "Personal Computer Lottery Game", methods and systems for playing, a player interactive lottery type game are described. A gaming piece, e.g., a printed card, computer memory, disk, contains a "Destiny Code" which is an encrypted symbolic code signifying the outcome of the particular game of chance to be played by the player. Game play proceeds under computer processor control to reveal whether the player has won, and if so, how much, or whether they have lost. The Destiny Code itself contains the win/lost information, and if a win, the amount. The outcome of the game is forced in that the processor controls the outcome of the game of chance. For example, if the Destiny Code indicates that the player is to win $75, the system can match the prize to the game play such that the desired outcome is achieved. If the predetermined outcome is a loss, the game play will include selection of losing numbers. Computer game play may be either local, such as at a stand alone terminal or remote through an on-line service. When played in the on-line environment, the Destiny Code is input by the player, and provides the encrypted information regarding the win (and amount)/loss outcome. In certain instances, the player may select the form of game to be played, e.g., a murder mystery, a horse race type game, or various card games. In the online environment, the system can store a Destiny Code and not allow the code to be played twice. A history file may include various information, such as the number of times the game medium was played, information about how many times the particular player has played, information about different habits of the player, and general information as to what has transpired in the game. A winning game medium is somehow marked to show that the particular Destiny Code has been played. Receipt of prize money may be made at a local machine or at a redemption location.

PCT Application No. WO 00/39761 in the name of Applicant Ingenio, Filiale DeLoto-Quebec, Inc., entitled "Computer Gambling Game". The game includes a computer program to provide a sequence of game states, which lead to a game outcome. A game seed is required by the computer program to generate one of the sequences of the games. Each game seed corresponds to one of the sequences of the game states. An initiator code is required to begin game play, that code being printed on an instant play lottery ticket or distributed via a computer network. The computer program utilizes a look-up table to retrieve the game seed corresponding to the initiator code. Oberthur Gaming Technologies has an integrated package of three lottery tickets and a compact disc which is sold through authorized lottery retailers. The compact disc contains a program having various games where entry of an access code is necessary to begin game play. The compact disc permits creation of a password, thereby providing limited access to the game. Winning tickets are redeemed at an authorized lottery retailer. The lottery ticket itself contains encoded information as to the win (and amount)/loss status of the ticket in that the retailer can scan the ticket to see if it is a winner.

Despite the wide spread participation in various forms of game play, as well as the suggestions for implementing those games on a mass communication network, such as through the telephone or Internet, the possibility for new games, or improved game play exists. In particular, there is a need for improved games of chance, which provide excitement for the player, and optionally a viewer audience.

SUMMARY OF THE INVENTION

This invention relates to methods and associated apparatus for novel game play. In the preferred embodiment, the games are game of chance.

In one of the instant inventions, a game is provided in which the player must communicate electronically with a remote location which contains the information as to whether a player will win or lose the game, and if they win, the prize that they will receive. In one implementation, a lottery game, such as a scratch-off lottery game, may include a unique access or Ticket Identification Number (TIN). In order to determine whether the player is a winner, the player must electronically access a remote site. Modes of electronic addressing of the remote site include Internet access, cable access, or access through a conventional communication network such as by a phone. The user is prompted to enter the TIN number, which is used by the system to access memory to determine whether the player has won or lost, and if they have won, the prize for winning. Game play proceeds via the electronic system in a way so as to ultimately inform the player as to whether they have won or lost and if appropriate, as to their prize.

When implemented in conjunction with a lottery type game, the system utilized consists of the lottery system, such as the online terminals located at various vendor locations, and additionally includes communication paths between the electronic game play path, e.g., via the Internet through website game play, and its interaction with the lottery system and its associated database. The lottery processing system may be separate from or integrated with the servers and systems which permit electronic game play. These servers or systems may access information, such as ticket database information, financial data or lottery real-time information.

By way of a more specific example, the lottery game may comprise a conventional scratch-off type game, and include a second or auxiliary game with the base game, such as by providing the two games on a given lottery ticket. The second game includes at least the provision of TIN number information for the player to electronically access the game play system. Optionally, the second game may include a scratch-off aspect on the same ticket which can reveal variable information, such as whether the ticket will entitle the holder to play the second game, e.g., where, for example, two out of five numbers must match, the prize amount the player will play for in the second game, or other variable factors such as the game to be played or the degree of difficulty of the game. The player enters their TIN number over the electronic communication system, wherein turn the number is checked for validity and entitlement for game play. Entitlement for game play may include a determination of whether the TIN number has been previously used. Assuming qualification and entitlement, the TIN number is utilized by the system to look up in memory various aspects about the game play, e.g., what game is to be played, whether the player will win or lose, and the type of prize to be awarded to winners. The system retains a record of TIN numbers which have been played. Redemption of prizes may occur at the authorized retail vendor locations equipped with the lottery infrastructure. The vendor may positively confirm that the TIN number has been played in the electronic game through use of the lottery terminals and infrastructure. Payment of the prize amount may be conditioned on receiving a positive indication that the TIN number has been utilized in the electronic game play.

In yet another aspect of the invention, promotional materials are provided in association with the electronic game play. For example, the lottery system knows the identity of the vendor of a batch of tickets, and may use that information to offer a personalized coupon or promotion. The information regarding coupons or promotions may be provided to the vendors check out and scanning system so as to automatically apply the discount. Optionally, frequent player's clubs may be utilized, such as where points are rewarded for game play. Typically, such a club or system requires player identification, and preferably includes a second form of player identification, such as a code or their own personal PIN number.

In one version, a game comprises the steps of randomly selecting a target number from a first range of numbers having a minimum and a maximum, e.g., from 20 to 50. The number may be selected by the house, or by a player, of by an alternate method of number selection. After presenting the indication of the target number to the player, the player selects numbers from a second range, having a minimum and a maximum, where the maximum is equal to or less than ½ of the minimum of the first range. For example, the second range may be from 1 through 10. The player elects whether or not to draw another number from the second range. The player continues to draw, and the total number of the various graphical depictions being summed, until the player declines to draw further. At that point, the system then draws repeatedly, and randomly, from the second range. The player wins if the system draws numbers which total in excess of the target number. The system wins if the drawn numbers exceed the player's total. Optionally, the system may provide an indication of the odds that the player would go over the target with a subsequent draw. This game is arbitrarily termed JACK-O.

In yet another game, arbitrarily termed POKO, the system receives a buy-in from the player. Multiple indicia are randomly selected from a predefined set, e.g., the numbers from 1 to 10. The system may select a predefined number of numbers, such as 5 numbers. A graphical depiction of the randomly selected indicia are displayed to the player. Optionally, the display may consist of a depiction of a ball, such as the type of ball used in a lottery drawing. Next, a second group of multiple indicia are randomly selected from the predefined set. The number of indicia selected is the same for both the player and the house or system. The first and second sets of numbers are then compared under predefined sets of rules to establish a winner. Payment is then provided to those winning under the rules. By way of example, the system may define a rule for an automatic winner where the player receives five of a kind, e.g., five 7's. Other rules may be utilized, including those from conventional games, such as Poker.

In yet another game format, a second or ancillary game is played in parallel with a first or primary game. By way of example, in association with a first game comprising a lottery number ball draw, a second game may involve a selected player's guessing whether the next ball draw will be of a higher or lower number, or odd or even or the like. For example, during the real time ball draw for a lottery, the improved game play would involve running a parallel or ancillary game along with the ball draw. One implementation would involve a first ball draw, followed then by game play by a contestant such as predicting whether the next ball drawn would be of a higher or lower number, or would be odd or even.

In one implementation, the master of ceremonies would advise the player which of these options had a better probability of being the outcome, thereby making the ancillary game more a game of chance as opposed to a game of skill. Optionally, scoring may be done, such as where one player or audience participant is scored or ranked relative to another player or participant. Optionally, this game may be played through a quick pick format, or through an online or other real time communication network format.

Yet another game format is arbitrarily termed The Zone. In this game, a number is randomly selected from a first range of numbers preferably having a minimum equal to the sum of the lowest numbers to be drawn and a maximum equal to the sum of the highest numbers to be drawn. The game proceeds with sequential drawing of numbers until the player has a total of the draws approaching a predefined zone away from the target number. For example, the target zone may be numbers within 10 of the target. Payment amounts are based upon the player's proximity to the target number, preferably without going over the target number.

Yet another game is one played at a multiple number of levels. At each level, the contestant is presented with multiple options, such as a depiction of four uniquely labeled boxes, amongst which the contestant may choose. The options would include at least one positive outcome and at least one negative outcome. In the case of four boxes, e.g., one could include a strike, two could include a monetary amount, which may be either the same or different and optionally, the fourth box could comprise a mystery box, described below. The contestant selects, at random, one of the options. If the option selected is one of the positive options, such as a monetary amount, they proceed to the next level and the winnings are added to the prior winnings total. If a negative option is selected, such as a strike, in the preferred embodiment, the level is reset and play continues at that level. Preferably, the player is allowed a predetermined number of negative events, such as three strikes, prior to discontinuing play.

The 'mystery box' consists of a decision within a decision. A first decision was to select that option, which then was revealed as comprising a mystery box. The player is then given the option of whether to reveal that option. The option within the mystery box would include at least one positive result and at least one negative result. In the preferred embodiment, there would be three results possible with a mystery box, a positive result such as a multiplier for the money, such as a doubler of the contestant' prior winnings, an updating of the safe level for the player or an additional monetary amount. Alternatively, other positive results such as a free play or a reduction in the number of negative events is possible. Preferably, the probability of a negative result from the opening of the mystery box should be equal to the probability of a negative event if the mystery box were not selected.

In yet another aspect, game play utilizes the real time data compiled during a lottery ball draw. Most particularly, the data regarding the number of potential lottery winners is utilized for companion game play. The data may be used directly, such as where the absolute number is guessed or by counting the number of times a given digit appears, or indirectly, such as where the game determines if a digit of the next number will be higher or lower than the last. The data may be used as a secondary random number generator.

The prizes at the various levels may be set as desired to result in a predetermined pay out for the game. Optionally, guaranteed low end prize structures (GLEPS) may require payment of predetermined prize amounts, and possibly payment of a minimum amount of a prize e.g., $500.00. The monetary spacing between various levels may be set as desired, either as an arithmetic progression or as a multiplicative progression, e.g., a substantial doubling of the prize amount at every level. Optionally, when a maximum game level is reached a jackpot or other proportionally large prize may be awarded. If the jackpot is not won in a given game, it may then roll over to a subsequent game. Alternative forms of progressive play may be utilized.

In another aspect of this invention, game play in a first game may require progression through a plurality of levels, leading to game play on a second game for those who have reached the maximum level on the first game. In one implementation, the maximum prize level in the first game may be equal to the minimum prize level in the second game.

Various modes of play are contemplated. In studio game play may be utilized with a broadcast, either live or for taped replay. Yet another mode of game play involves playing at a gaming venue, such as where other games of chance, e.g., slot machines, are played. Yet another venue may consist of game play by the player from their hotel room in a venue which allows gambling. In yet another mode of game play, a network, such as the Internet, may be utilized to permit game play, whether for a monetary amount or to provide other points or indications of score. The game may be played in any venue where not prohibited, whether on land or in an airplane or ship, and may be played in any form of wired or wireless environment, such as via hand-held web enabled communication devices.

The game may be played by a single individual, or may be played with multiple players. The multiple players may play against one another, for scoring, or may merely play in parallel without further interaction.

In yet another aspect, methods and apparatus are provided for participating in on-line or other electronic access games, especially lottery games played over a network, such as the Internet. A player would obtain a lottery product, either scratch-off or on-line directed to playing an electronic game, such as a game on the Internet or played through a telecommunication network, either wired or wireless. By utilizing the conventional sales and distribution channels, the traditional safeguards regarding sales of gaining tickets to under aged players can be maintained. Having obtained the ticket containing a participation number, the player may then enter that number electronically, which would enable play for the amount of money purchased. Winnings may be paid out by presenting the ticket to a retailer, who could verify the winnings via a conventional on-line system. Optionally, the ticket may contain variable information regarding the electronic play, such as the amount to be won, the level of difficulty of a game or what game could be played.

In yet another aspect, the games described herein may be played either as a probability game or as a predetermined outcome game. In the case of a probability game, the outcome is determined based upon the actions of the player. In a predetermined outcome scenario, the system has determined which ticket or tickets are winners, or at what level the win will be paid, and the action of the player has no impact on the outcome of the game play. While the appearance of selection may still appear to be "random" to the player, the system may select the required number or other indicia in order to force the predetermined outcome.

Accordingly, it is an object of this invention to provide an improved game of chance having a higher level of audience interest and potential participation.

It is yet another object of this invention to provide for an improved Internet game of chance.

It is yet a further object of this invention to provide for enhanced modes of game play in association with existing forms of game play.

BRIEF DESCRIPTION OF THE DRAWINGS

FIG. 3 shows a perspective view of a casino type apparatus.

FIG. 4 shows a lottery ticket for possible participation in a feature broadcast game show.

FIG. 5 shows a perspective view of a scratch-off implementation of the game.

FIG. 10 shows graphical depictions of a lottery game in miniature form.

FIGS. 18A through 18E depict various potential data field within the remote play system.

FIG. 19 shows a chronological flowchart for game play requiring an affirmative indication of remote game play prior to redemption of the player's prize.

DETAILED DESCRIPTION OF THE INVENTION

Figure 1:
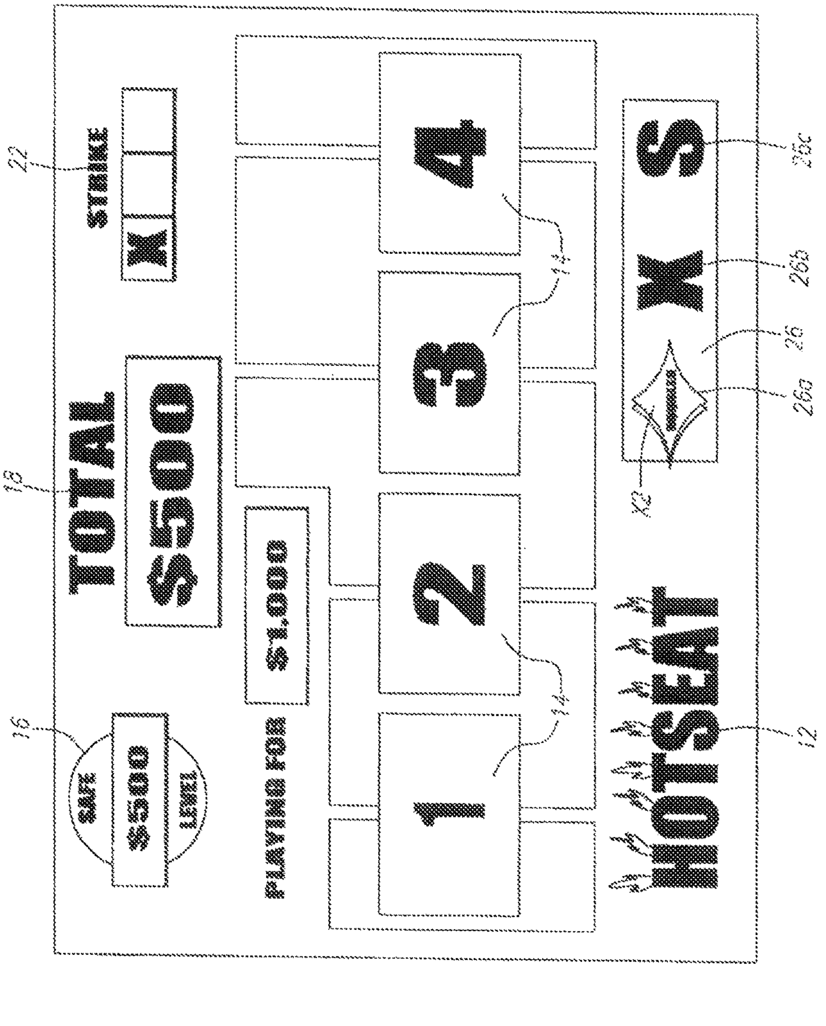
FIG. 1 shows a screen of the type particularly adapted for a broadcast type format.

FIG. 1 is a view of one possible display for use in game play. For example, the depiction may be of a portion of a broadcast studio with associated game play, such as for television broadcast. The display 10 may optionally include a logo or other word mark region 12. The multiple options presented to the players may be depicted as uniquely designated boxes 14. While shown as numbers in FIG. 1, the designators for boxes 14 may be of any form, such as letters, characters or other visual depictions. The display preferably will include other functional aspects of the game. A safe level display 16 displays that amount of money or points which are guaranteed to the player in the event that they can no longer continue with the game given that they have reached a predetermined negative level. The total display 18 shows the total amount of money, points, prizes (cash or non-cash) or other winnings accumulated by the player. The strike display 220 shows a depiction of the number of negative events, here strikes, which have occurred. As shown, the display 10 contemplates three strikes in the game. As shown, sub box 24 includes a "X" indicating one strike.

Display region 26 shows the possible outcomes from the selection of the mystery box or other denominated decision within a decision. As shown in display 10, the outcomes of the mystery box include a multiplier for the monetary amount previously won by the player, here shown to be a multiplicative doubler of the monetary amount (shown at 26*a*), or a negative result, such as a strike (shown at 26*b*) or an updating of the safe level (as shown at 26*c*).

Figure 2:
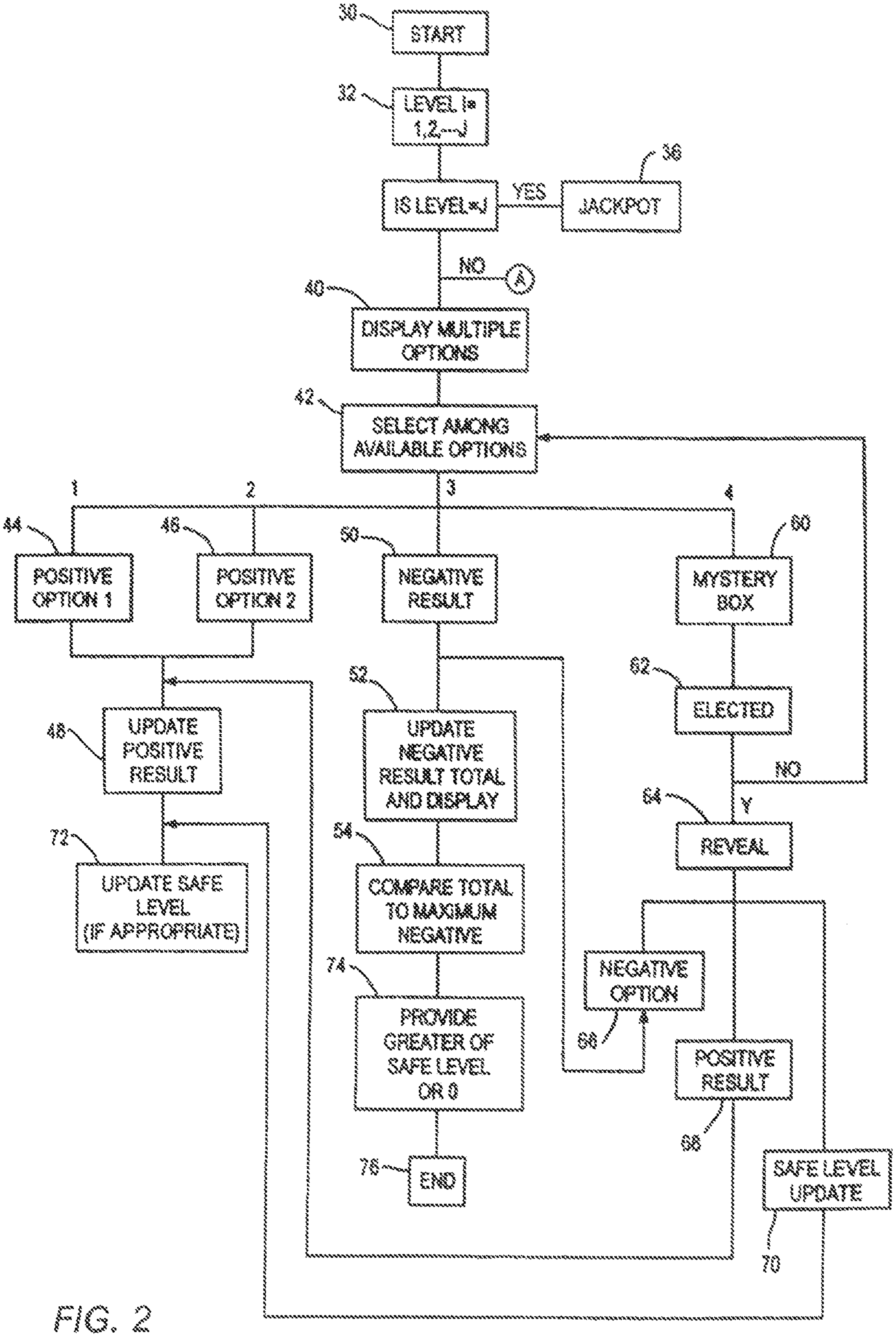
FIG. 2 is a flow chart showing options for game play.

FIG. 2 is a flowchart of one implementation of the game format. The game starts with start box 30. Level box 32 indicates the multiple levels possible for game play. Game play begins at the first level. The number of levels ends at the first level. The number of levels may be chosen consistent with the expected pay out and desired duration of the game. In a half-hour or full hour broadcast format, 10 or 15 game levels may be desired. In contrast, a sixty second or few minute game may only involve three, four or five levels. Decision box 34 determines whether the maximum level has been reached, and if so, indicates that the jackpot 36 is to be awarded. In the event that the jackpot is not awarded, it may be rolled over for future games.

Returning now to the flowchart, the multiple options 40 are displayed to the contestant. As shown in FIG. 1, the multiple options could comprise four uniquely numbered boxes or squares. Any form of display or random selection may be utilized. Thus, while the term "display" is utilized, it should be construed in a manner consistent with selecting, such as where an alternative random selection method is utilized. One possible alternative is the ping pong ball draw, such as where the balls are distinguishable and are drawn by the machine. Yet another selection method could include a computer generated selection, such as through the use of a random number generator. Thus, the output of selection box 42 is a determination of one of the various possible outcomes from that election or selection.

As shown in FIG. 2, two positive options, positive option 1 44 and positive option 2 46 are shown. The positive, options 44, 46 may represent a monetary amount, a point value or other financial or prize information. In the preferred embodiment, the positive options are of an equal amount, though they may be of differing amounts or of differing types of prize.

The negative result box 50 may be of various types. In the preferred embodiment, the negative result 50 may comprise a strike. Preferably, the game is structured as to permit a predetermined number of strikes, such as 3 strikes, prior to the player losing the game. In such a system, the system would update the negative result tally at box 52, and perform a comparison 54 of the totaled number of negative events to the maximum number of negative events allowed. If the comparison 54 indicates that the maximum number has been reached, then program flow proceeds to box 74 where the player is awarded the last existing safe level amount, or if no such safe level amount exists, then whatever minimum prize is indicated according to the rules. That minimum amount may be 0 or some other guaranteed amount. Certain lottery systems require guaranteed low-end prize structure (GLEPS) which guarantee a certain prize or result for certain contestants.

The fourth option shown in FIG. 2 consists of the mystery box 60. In the preferred embodiment, the competitor is given the option at decision stage 62 whether to reveal the content of the mystery box. If the player elects not to elect the content of the mystery box, then play resumes at the same level with four boxes. However, if the player elects to reveal the content at step 64, the content may consist of a negative option 66, positive result 68 or safe level update 70. In the event that the negative option 66 is selected, the negative result is updated at box 52, with the player indicated comparison step 54 being performed. Program operation is the same as for the flow leading from the negative result box 50. In the event that a positive result 68 occurs, the program flows to box 48 for an update of the positive result. For example, if the positive option 1 44 is a monetary amount, the monetary amount may then be added to prior winnings, or alternatively may be the entirety of the award which may be won.

If the safe level update box 70 is selected, the safe level is updated at box 72. In this way, when the player has reached the maximum number of events at box 54, the safe level amount 72 is then provided. After the update of the positive result 48, and optionally, an update of the safe level 72, program flow returns to the level selection 32, at which time the next higher level is selected.

In the preferred embodiment if the number of negative results is less than the maximum number of negative results (box 54), then the decision flows to path A, which returns the player to the decision to select among the available options 42. In the preferred embodiment, when the player has received a strike at a given level, the level is reset and played again. Alternatively, in the event of a negative event, the negative event could be tallied and the player advanced to the next level.

FIG. 3 shows a perspective view of a device for use at a gambling or gaming venue. A housing 80 may include a display 82, such as a CRT or flat panel display, on which is displayed the multiple options 84. The other information or designations may be as described in connection with FIG. 1 and FIG. 2. For example, the display 82 may include a designator 86 for the amount the gamer is playing for. A display 88 may visually depict the number of strikes existing. A selection system 90, such as an array of buttons is utilized for player input of the desired selection. However, any mode or manner of input may be utilized. For example, a computer mouse, voice detection system or other input mechanism permitting the player to interface with the machine may be utilized consistent with the goals and objects of this invention. The display may include a depiction of the total amount then won, or comprising a safe level. Optionally, a slot 94 for pay back of a player's winnings may be provided. Alternatively, the payment format may be of any various mode, such as if players based upon the use of credit card information, the credit card may be provided with a credit in the event that the player is a winner.

The displays of FIG. 1 and FIG. 3 may be of various types and resolution. For example, certain of the displays may be in a standard resolution format, whereas others may be in a high resolution format. Certain of the displays may show a graphical image, whether static or dynamic, and yet other displays may show textual information. Combinations of any of the preceding, e.g., text on certain displays and high resolution dynamic images on other displays, may be utilized.

In addition to visual displays, voice prompts may be provided, such as where the contestant is prompted to enter information or is otherwise cued to provide a responsive action. Voice input to the system is also feasible.

FIG. 4 shows a ticket 100 having a front face and a back face. The ticket 100 may include textual data such as state lottery or may include other graphic indicia indicative of the game. In one implementation, the lottery ticket 100 includes a means or mechanism for the players to be selected for inclusion in a broadcast in the underline game. A scratch-off layer 106 is deposited on an operative portion of the ticket, which, when removed, reveals images. As shown in FIG. 4, the scratch-off layer has already been removed from the left and center images, depicting the television sets. Thus, if the player were to possess a card 100 that had three television sets, that may form the basis for their participation in the broadcast game show, or to permit them to participate in the selection process leading to the broadcast game. By way of example, having a lottery ticket with three similar images may permit the player to be entered into a drawing or other selection mechanism for game play.

The images 104 and game play associated therewith may be in addition to the game play of a lottery, such as designated by the numbers 108. Thus, if a player purchases a ticket and receives numbers 108, they may be additionally entitled to play the game depicted by the graphics 104 for possible play on a future lottery game show. In this way, interest in a future lottery game may be created through game play on an existing lottery.

As shown, the ticket 100 optionally includes a bar code 112. As shown, the bar code 112 is disposed on the backside of the lottery ticket. The bar code 112 may be placed wherever desired. In operation, the machine readable bar code may be utilized for tracking or other monitoring purposes.

FIG. 5 shows a perspective view of a ticket or card 120 representing a scratch-off version of the multilevel game. Card stock or other substrate 120 has printed thereon an indication of the various levels of the game 122, such as 1, 2, 3 . . . 15. The player is presented with multiple regions 126 for scratch off. As shown, the player having scratched off the first box at level 1 revealed a winning prize of $2.00 at level 2, the player selected the second column, which results in a strike or X. At level 3, the player revealed the right most scratch off, revealing a winning number of $3.00. At level 4, an X was revealed in the third column. At this point, the player has two strikes. The player has then further elected at level 5 to reveal the scratch off in the first column. Thus, at this stage, the player has $7.00 of revealed winnings and two strikes. At this stage, the player could elect to discontinue play. The ticket may then be brought to a redemption center and receive the money in exchange for the ticket. In the event that the player continued to reveal obscure information, and that the predetermined number of negative events, such as 3 strikes, was reached, the ticket would become void and no compensation would be provided.

The games of this invention may be adapted to an on-line selection format, such as where a potential player purchases a lottery or lotto ticket at a retail vending location. The player may be prompted to provide their selection of numbers, such as where they provide one of four numbers for each level. That information may then be passed in an on-line manner to the lottery system. Optionally, game play on the television or other broadcast media may be used for game play by the viewing audience. For example, the game play of successful game play at a given level may be compared to the player's selections previously made through the on-line process. Improved audience viewing levels of a game of chance would result.

The game described herein may be played in any variety of formats. For example, the game may be played in a 30 minute or 1 hour television broadcast type format. Alternatively, the game is adaptable to a short, e.g., 60 second, format. Game play may be done in a broadcast mode, such as through in studio participation, either live or taped. Alternate modes may be utilized, such as in a gaming or gambling establishment. Game play may be over a network, such as the Internet or an Intranet. In an Internet game the player may provide credit card information or otherwise have an account with a monetary stake, and that amount may be increased or decreased as the player wins or loses. Alternatively, instead of money, the player may play for points.

Contestant selection may be done by any number of modes or modalities. For example, as described in connection with FIG. 4, a scratcher type ticket approach may be utilized. Alternatively, an online ticket, may be utilized wherein during the printing of the play slip (to reflect the numbers either selected by the customer or generated by a quick pick). In an alternative implementation, Internet play, such as the high score may be utilized to select future contestants. In yet another implementation, a real time selection may be utilized, such as where a player is on the net and is selected by the system for future game play.

Figure 6:
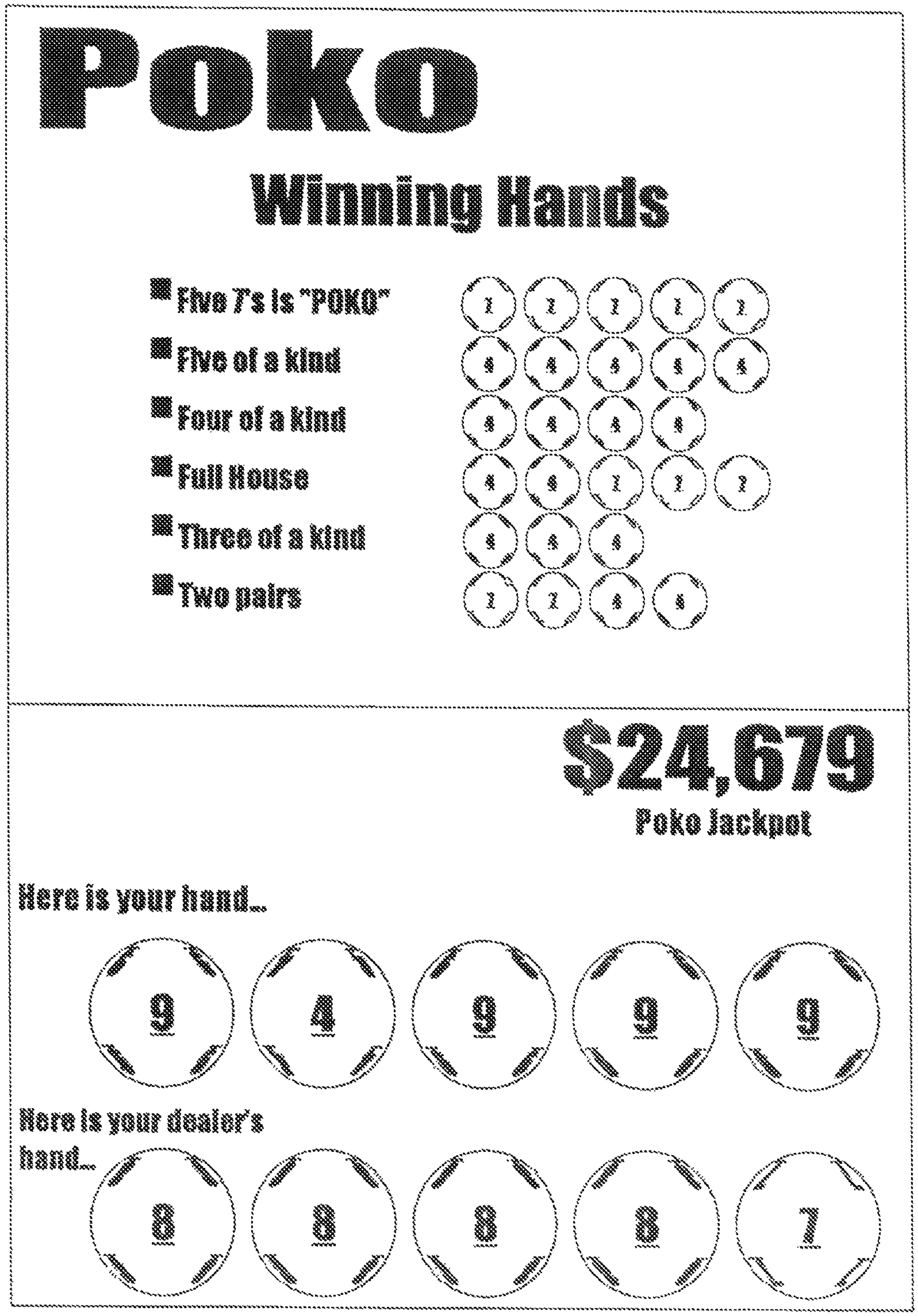
FIG. 6 shows graphical depictions of a lottery game termed POKO.

FIG. 6 shows various graphical depictions relating to a lottery game. The game is termed "POKO" but may be variously named. In a first step, a player "buys in" to the game, either by affirmatively providing a wager amount, or by accepting a preset amount as a buy in. The acceptance may either be through an affirmative act, such as through payment of an amount at an in-store, on-line location, or through other forms of remote game play, such as by clicking or otherwise accepting or entering an amount into a computer or communications device, or merely through acquiescence and continuing game play (especially where a preexisting credit account or other ability to determine credit worthiness is utilized).

After having received the player's buy-in, the system randomly selects multiple indicia from a predefined set. In one embodiment, the predefined set may comprise a set of numbers, such as 1 through 10, and the number of indicia selected may be 5. As shown in FIG. 6, the graphical indicia may constitute numbers, further being depicted on an image of a ball, most preferably a ping-pong type ball. In addition to, or in lieu of numbers, graphical images may be utilized, including classic card images including Ace, King, Queen and Jack. Since a physical card deck is not utilized to select the multiple indicia, but rather, a random selection is utilized, it is not possible the player to "count cards" in the game.

After the various indicia, e.g., a set of first numbers, is selected, they are provided to the player in some graphical depiction. The mode of presentation of the graphics may vary, and the mode of presentation may be selected consistent with the communication bandwidth available. For example, if the game is played over a wireless device, especially one using a text messaging service, such as SMS or equivalent service, the graphical depiction may be merely of the number or other alpha numeric character supported by the display set of the device. For example, when playing POKO, the display may show 77777 indicating the player's numbers, or may optionally also include the display for the house. Characters may be displayed all at once or over some period of time. In a relatively higher bandwidth environment, the graphical depiction may constitute an image of the indicia, such as a number, on a ball, such as a ping-pong ball. The indicia may be displayed to the user on a screen, such as when the game is played over a computer network (wired or wireless), or may be printed on paper or other support media such as when a player purchases a ticket from a business establishment utilizing an on-line ticket dispensing system. Alternatively, the numbers may have been picked beforehand, printed onto a support medium and obscured, such as through the use of a scratch off layer.

The player now having received their numbers or indicia, the game proceeds to the random selection of a second group of multiple indicia from the same predefined set. Thus, in one embodiment, the "house" (also variously referred to as the system or equivalent terminology) would select an equal number of indicia, such as by selecting five numbers. Preferably, the mode of display of the second group of numbers is similar to the first. Thus, as shown in FIG. 6, the ball indicia are utilized for both the first set of numbers (the players) and a second set of numbers (the house). Next, the first set of indicia and the second set are compared in order to establish a winner under a predefined set of rules. As shown in FIG. 6, a "POKO" may consist of all indicia being identical, such as where five 7's are drawn. In relative order, five of a kind would be four of a kind, which in turn would be a full house, which in turn would be three of a kind, which in turn would be two pairs, which in turn would be a single pair, which in turn would beat a high ball. As shown in the graphic of FIG. 6, if the player's hand consisted of a 9 4 9 9 9, and the dealer's hand consisted of an 8 8 8 8 7, each player having four of a kind, the player would win given that their number is higher.

Finally based upon the outcome of the winner determination, payment is provided, as appropriate. In one implementation, any POKO winner would share the overall jackpot. Other winning hands may be paid out with a fixed amount. For example, those having five of a kind may receive $100, those having four of a kind receiving a smaller amount, e.g., $50, and so on.

While the foregoing description utilizes the winning hand determination of poker as the defined set of rules, other existing game rules be utilized as desired. By utilizing a truly random mechanism for selecting the indicia, the game becomes one of chance, as opposed to having a component based upon skill. Further, by utilizing a graphical depiction drawn from the conventional images associated with a random draw in a lottery, the game achieves more of a look and feel of a lottery, as opposed to a game of skill.

While described, above, for one player, the game may be expanded to an arbitrarily large number of players. When the game is played in a real time environment, such as over the television or other communication network (wired or wireless) the game may be played at predetermined times. For example, the game may be played every 15 minutes on the hour, once a day, etc. Optionally, a portion of the collective monies being wagered may go into the pot. In this way, there is the possibility of a carry-over amount, and the possibility of a "lottery fever". In yet another aspect, the game permits multiple purchases of entries. For example, a player buying tickets at a retail establishment may purchase a first ticket and only receive a "pair" of matching numbers. The player may continue to purchase additional tickets until receiving one that the player believes may be sufficiently valuable to have a acceptable chance of success. Such an arrangement may be performed either through a standard quick pick arrangement or via a scratch off. In contrast to a conventional lottery number selection scheme, the player must be precluded from selecting their own numbers in this game.

In yet another aspect, a push/pull system may be utilized. In such a system, the main system initiates the contact with the prospective players, such as by sending an SMS message or email. The player may then elect to participate, or not. In the event that the system provides information to the prospective player about their possible numbers, then the system may require a variable level of payment, such as where the system charges a first amount if the player elects to pass, in a second, higher amount, if the player elects to participate in the game.

Figure 7:
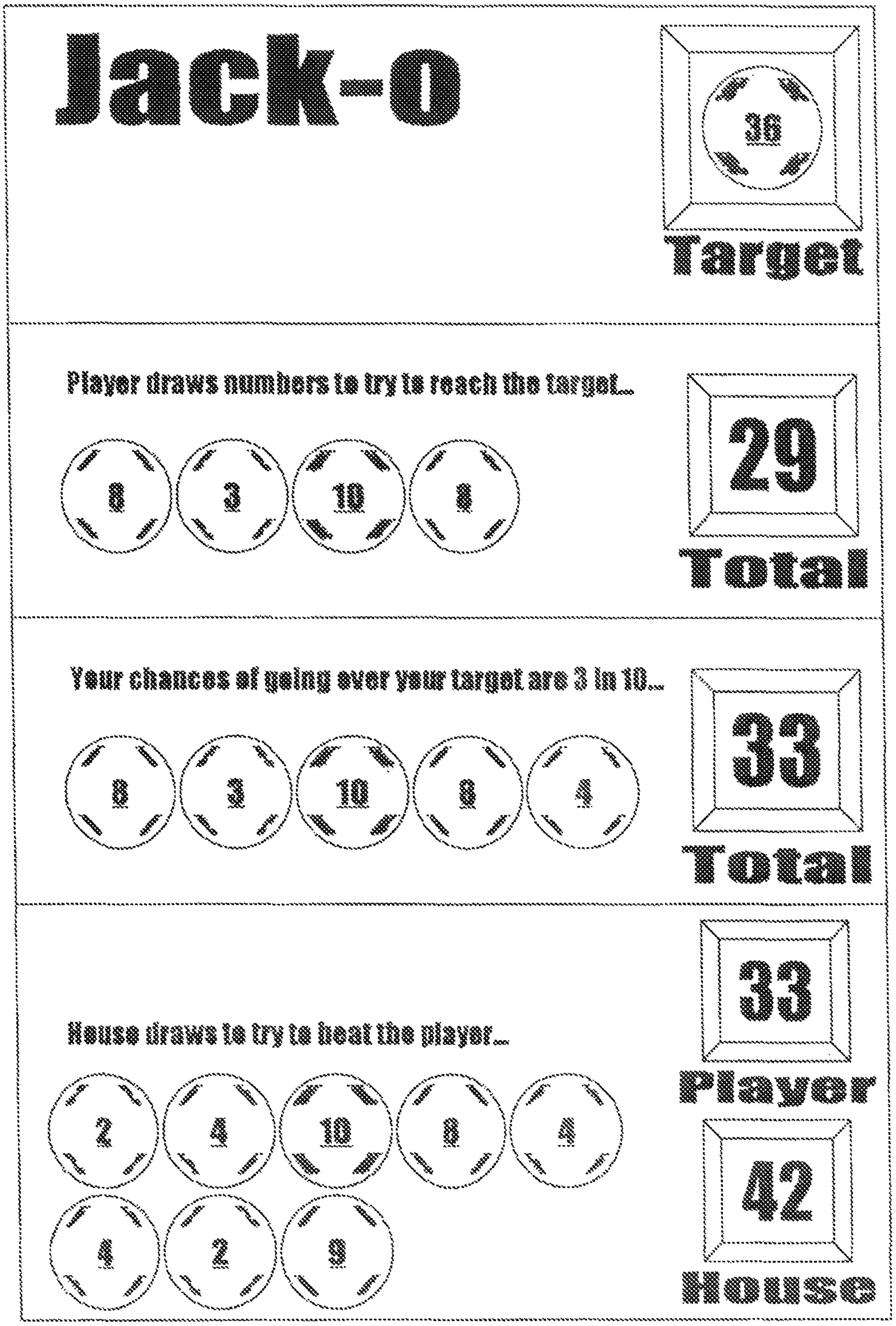
FIG. 7 shows graphical depictions of a lottery game termed Jack-O.

FIG. 7 shows a depiction of a lottery game termed "JACK-O". As shown in FIG. 7, a target number is randomly selected from a first range of numbers. The range of numbers includes a minimum number and a maximum number. For example, a typical range for the target numbers would be from 20 to 50. The player or the "house" (the system implementing the game) may select the target number. A graphical indication of the target number is presented to the player.

Next, a number is randomly selected for the player, where the number is selected from a second range, the range having a minimum and a maximum number. The maximum of the second range is equal to or less than ½ of the minimum of the first range. By way of example, if the second range is from 1 to 10, the first range is at least 20. Game play continues by receiving an indication from the player as to whether to draw again. If the player elects to do so, a next randomly selected number from the second range is presented to the user. The cumulative amount of the draws is titled. This step is repeated either until the player declines to draw further or the title exceeds the target number. In the event that the player declines to draw, the system randomly selects numbers from the second range, accumulating those numbers and comparing the total to the player's accumulated total amount. The winner is the one who has the highest total closest to or equal to, but not exceeding, the target number.

In yet another aspect of this invention, the player may be advised upon the option for a draw that there is a possibility going over the target number. Further, the system may optionally provide an indication of the odds of exceeding the target number.

In one implementation, this game would be played in an interactive mode. Computer or other communication access would permit effective game play. Multiple players may play in parallel against the house, with the display for the other players being included upon all player's screens. While the main implementation contemplated includes a graphical display, yet other forms of conveying information to a player may be utilized, e.g., by providing the information audibly to the player, such as via the telephone or other speaker arrangement on a communications device.

Various aspects of enhanced game play and novel game are disclosed. In a first aspect, the game play method and system provides for the playing or running of a parallel game or ancillary game along with a first or primary game. For example, during the real time ball draw for a lottery, the improved game play would involve running a parallel or ancillary game along with the ball draw. One implementation would involve a first ball draw, followed then by game play by a contestant such as predicting whether the next ball drawn would be of a higher or lower number, or would be odd or even.

In one implementation, the master of ceremonies would advise the player which of these options had a better probability of being the outcome, thereby making the ancillary game more a game of chance as opposed to a game of skill. Optionally, scoring may be done, such as where one player or audience participant is scored or ranked relative to another player or participant.

Figure 8:
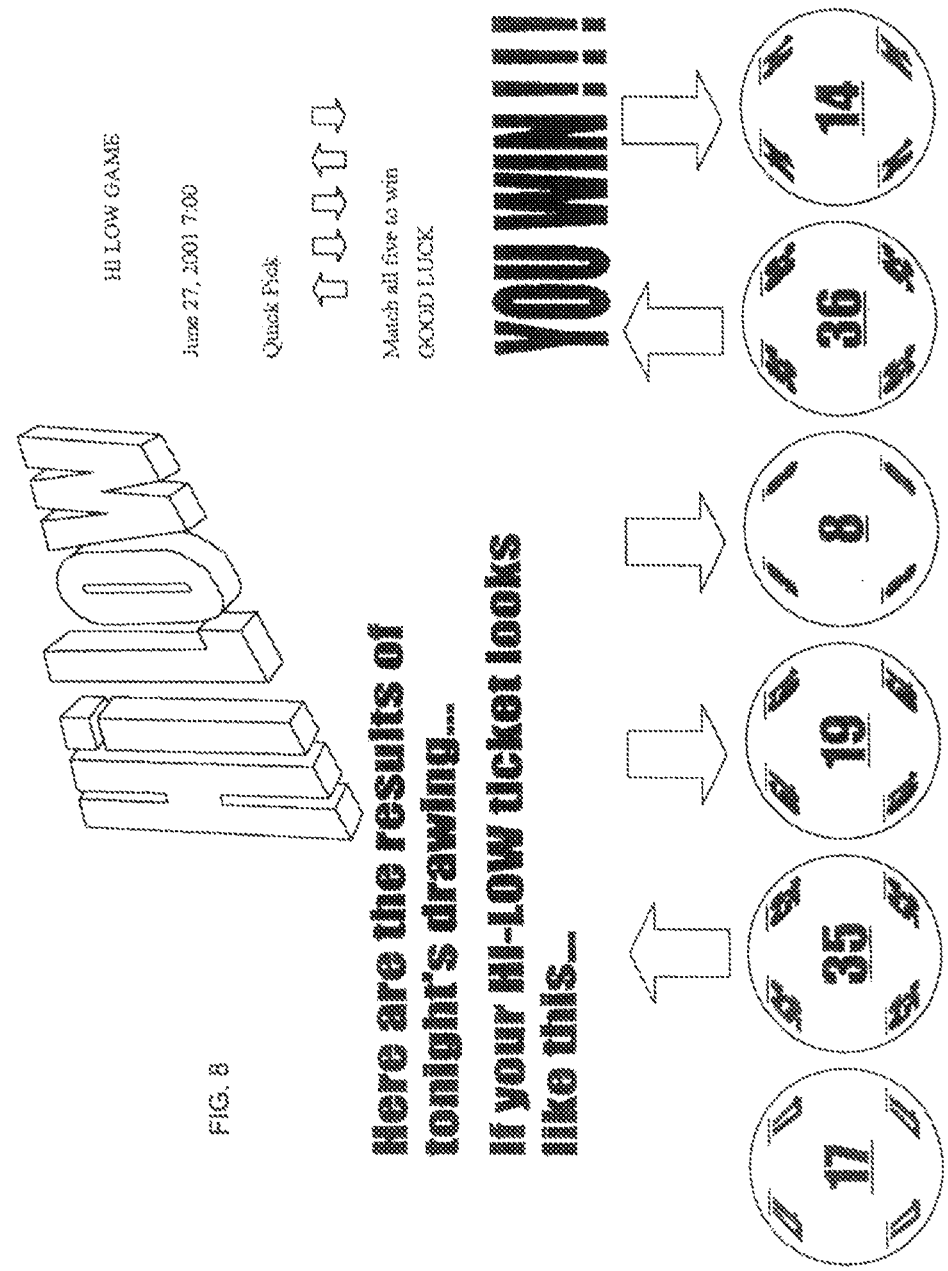
FIG. 8 shows graphical depictions of a lottery game termed High-Low.

FIG. 8 shows a graphical depiction of a game termed "HIGH LOW". The game is played along with a first lottery selection of a series of randomly selected numbers. For example, the instant game would be played in conjunction with a ball draw of six randomly selected balls bearing unique numbers for purposes of a traditional lottery game. The instant game then includes the step of receiving an indication whether the second ball to be randomly drawn in the base game will be higher or lower than the first draw. The player may continue through the game so long as their prediction as to higher or lower is correct.

In one implementation, the monetary award to the player may be based upon the number drawn in the base lottery. For example, if the first ball drawn in the lottery is 17, the potential prize award amount could be some multiple thereof, such as $17,000.00. If the next number drawn in the base lottery is 35, and the player as guessed "higher", then the 35×the multiplier, e.g., $35,000.00, may be added to the prior total, raising the potential winnings to $52,000.00.

The game may be played in real time, that is, simultaneously with the base game, where the input mode permits essentially real time input. For example, input via a computer system or other communication system (wired or wireless) may be utilized. Alternatively, the selection of high/low may be made prior to the selection of the base numbers. The selection of the high/low may be made affirmatively by the player or may be done by a quick pick method. As shown in FIG. 8, a ticket may include an indication as to when the base game will be played, e.g., Jun. 27, 2001, at 7:00 p.m. And indicates the series of high/kiss outcomes. By running this game in parallel with the base lottery selection, viewer interest in the base lottery drawing is prolonged. Optionally, yet another option to win based on the full outcome of the base lottery selection may be provided. For example, the total number of "higher" ball draws may be rewarded. Alternatively, the final sum of the various ball draws may be rewarded.

In addition to monetary awards, the result of the game play may result in other opportunities or prizes. For example, the winner of the corollary or ancillary game may be placed in a pool for a drawing to be on a subsequent television or other broadcast show, such as a subsequent baseball draw. Systems and software currently exist, such as those supplied by Gtech, which permit the real time monitoring of the number of players holding tickets or participation interests which are still potential winners. In connection with the high/low game, the system may also monitor in real time the number of players of the high/low game who remain as potential winners.

Figure 9:
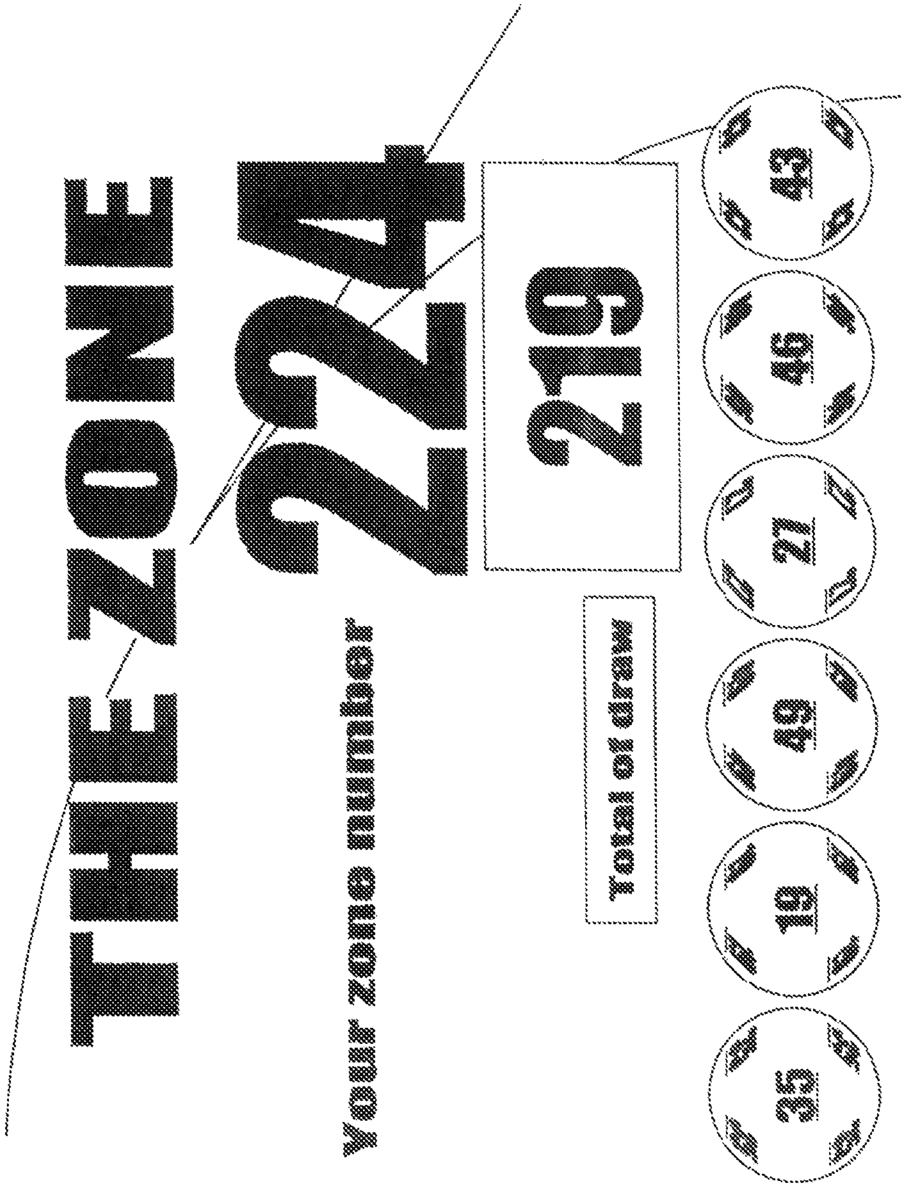
FIG. 9 shows graphical depictions of a lottery game termed The Zone.

FIG. 9 shows a graphical depiction of a game entitled "The Zone". The game is intended to be played in conjunction with a lottery type ball draw, that is, a drawing involving a random selection of a series of numbers. Typically, the series of numbers for the ball draw is in the range from 1 to 49. The maximum total of the numbers in the ball draw may be determined. Where the numbers are sequential, summing of the six largest numbers (44 to 49) is 279. The minimum number (summing 1 through 6) is 21. The player receives a randomly generated number. The number may be provided through a quick pick scheme, through a scratch off of a preprinted ticket, or by transmission of the selected number over a communications network (wired or wireless).

The random selection of a series of numbers for the base lottery then proceeds. The numbers for the base lottery are then tallied. Prizes are assigned or awarded to players based upon a schedule. For example, if the player's number equals the lottery total, the maximum prize would be awarded, e.g., $100,000.00. If the player's number is 1 away from, preferably 1 less than, the lottery total, a lesser prize is awarded, e.g., $5,000.00. The prize amounts continue to decrease as the difference between the player's number and the lottery total increase. Optionally, no further prizes are awarded once the difference between the player's number and the lottery total exceeds a certain number, e.g., 10 away. In the preferred mode of play, prizes are awarded only to those who have a player's number not exceeding the lottery total.

FIG. 10 shows a graphic depiction of a game show format, preferably played in a "miniature" format, namely, less than 10 minutes, more preferably less than 5 minutes and most preferably, in 3 minutes or less. In order for a person to participate in the show, home players may qualify to play via a communication path, such as telephone, Internet or other wired or wireless communication device. Typically, a predetermined number of people will qualify to play from home on the television show. Preferably, the on-air participants are selected to ensure quality game play and programming. The in-studio contestant is then asked a series of "super match" questions against a clock as a stake setter. The contestants are paid off for each correct answer they give, the game optionally limiting pay-off for any 1, 2, 3 answers. Contestants must answer the same as a contestant in order to remain in the game. Players are eliminated if they do not provide the same answer as the contestant. Optionally, at the end of the predetermined time, the contestant may keep their money or try to multiply it by a multiplier factor, e.g., 5 times. Out of the remaining home players who have answered as the in-studio contestant, a player will be picked, preferably at random. The remote contestant then must match the player in a head-to-head match.

Figure 11:
FIG. 11 shows graphical depictions of a lottery game termed On the Nose.

FIG. 11 shows a graphical depiction of a game entitled “On the Nose”. In this game, the house draws a target number from a universe of numbers, e.g., 20 to 50. One or more players draw numbers from a universe from 1 to 10. Players attempt to hit the target number on the nose without going over that number. Optionally, the player may freeze, that is, decline further draws, if they are within a predetermined amount from the target number. For example, the predetermined number may be 1, such that if the player is 1 away from the target number they may elect to freeze. The system (house) then draws in an attempt to beat the players. If the house hits the target exactly, the jackpot rolls over. The house will continue to draw at least to within the same predetermined distance from the target number as applies to the player. While any number of pay-out schemes may be utilizes, one preferred method is to share the jackpot amongst those hitting the target number on the nose, and to give those players who were within the predetermined distance from the target number an incentive for future game play, such as a free game play or reduced entry fee play.

Current lottery systems are often implemented in an “on-line” environment. That is, the sale of a lottery ticket, and the numbers corresponding to that ticket are, received by and stored in the overall system prior to the actual drawing of the lottery numbers. Thus, prior to the drawing of the lottery numbers, the system may determine how many tickets have certain combinations of numbers. That information may then be utilized for ancillary game play or for another purpose, such as for a secondary, random number generator. The following table provides exemplary numbers. For example, if the #1 ball is 28, there may be 22,316,429 people remaining. After the second ball draw of 15, there may be 6,562,156 remaining. The table then continues on through the sixth ball draw whereupon only two people remain.

| Ball | Number | # of Players with Numbers |
|---|---|---|
| 1 | 28 | 22,316,429 |
| 2 | 15 | 6,562,156 |
| 3 | 9 | 171,025 |
| 4 | 25 | 3,790 |
| 5 | 49 | 83 |
| 6 | 31 | 2 |

The absolute number of players remaining may be utilized directly. For example, either the absolute number may be utilized, for example, is the number higher or lower than a predetermined number, some portion of the number may be used. For example, the last digit may be compared to the prior last digit as to whether it is higher or lower. For at least the first number of ball draws, the last digit should be substantially random. In this way, a secondary random number generator is provided. The data regarding the number of players remaining may be used indirectly. For example, the contestants may indicate the number of occurrences of a given digit, such as the number of occurrences of a given digit, such as the number of 9’s in a given number. Thus, those who had wagered that there would be one 9 in the number of players with the given number would be winners as to ball draw #1. In this way, game play is based upon the number of remaining players as determined in substantially real time. In yet another mode of game play, players may be awarded a certain amount of money for every predetermined digit. For example, player may select a 4 and then for every 4 being revealed during the game, the contestant wins a predetermined amount, e.g., $25,000.00 for each occurrence. Thus, utilizing the data in the table above, the contestant would win $25,000.00 after the first ball draw because of the occurrence of one 4, but would not win further in this aspect as no further 4’s arose. Viewer interest in the underlying lottery draw may be maintained as the players continue to potentially win through to the end. Thus, even if the viewer has “lost” on the underlying lottery, they may still be incentivized to watch where each new ball draw generates an event which may lead to a further win. In yet another implementation, the numerical data relating to the number of players remaining may be categorized for the number of draws which ended up with numbers that were odd or even.

Figure 12:
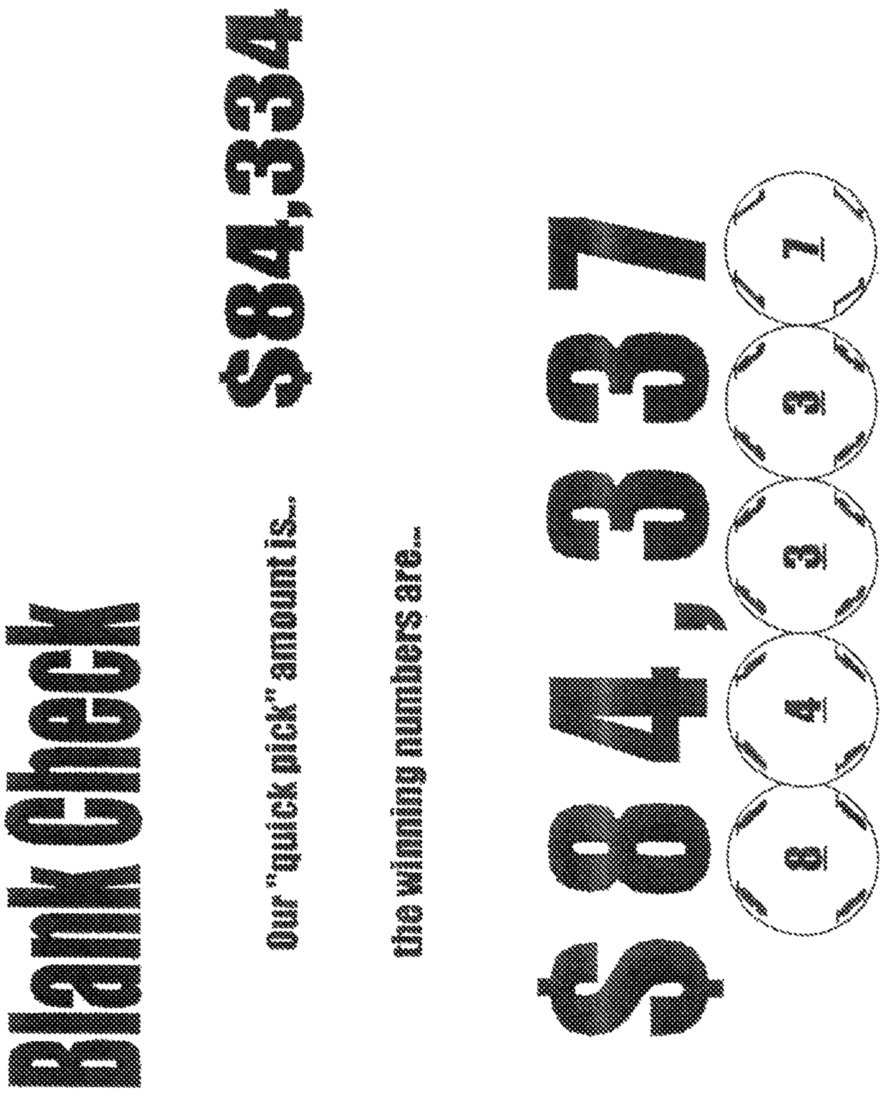
FIG. 12 shows graphical depiction of a game termed Blank Check.

FIG. 12 shows a graphical depiction of a game entitled “Blank Check”. A player is provided with a series of numbers, typically five numbers, corresponding to a monetary amount. The digits are randomly selected from the set from 0 to 9. In the example of FIG. 9, the player amount is 84,334. The game proceeds with a sequential random selection of numbers from the same range. As shown in FIG. 9, the sequence of selected numbers is 84337. For the first four digits, the player was still in the game.

In yet another aspect, the game play includes the use of contestant game play to determine lottery numbers. For example, a contestant may be blind folded or otherwise be made unable to see various options. The person then selects from among the various options as the means by which the random lottery numbers are drawn. One example could comprise a blind folded contestant selecting objects.

In yet another aspect, this invention relates to an interstitial game show. Main or regular programming, such as is broadcast on a given evening during prime time on a broadcast network would additionally include multiple interspersed, typically short, segments relating to game play. In the preferred embodiment, the game play would be for a relatively short period of time, for example, 1 to 2 minutes. For example, at 8:00 an initial round may be played prior to the beginning of prime time programming. Normal programming would then resume through the remainder of the 8:00 hour. At 9:00, a second short segment may be played. The play may continue at later times, such as to culminate at a show at 11:00. Preferably, the short segments would not necessarily be shown at a predetermined or predeterminable time as far as the audience was concerned. In that way, viewers who wish to see the progression of the segments would need to continue viewing that channel, or at least, return to the channel fairly frequently. Optionally, the game play may be progressive from one interstitial game segment to another. Players may be presented with the option of stopping play or continuing.

In yet another game format, the show would include a display having an underlying image, with that image being at least partially obscured by overlying image regions which differ from the underlying image region. A contestant would be given a time limit in which they would be presented with information relating to a suggestion or a clue relating to an overlying image region, which if the player responded correctly, would be removed so as to reveal that portion of the underlying image which was below the overlying image. The suggestion or clues may be related to the underlying image or may merely be unrelated suggestions or clues with respect to that particular overlying image region.

Yet another embodiment of game play provides for the repurposing of an existing taped game show. The previously recorded game show would be segmented into subsets of issues, for example, presentation of questions or answers (as in the case of Jeopardy), those issues would be presented to one or more players, a response would be received from those players, and the answer would be compared to the correct answer. Scoring would then rank players relative to one another or to indicate the amount of the prize. In yet another game play implementation, one or more contestants would be presented with multiple images upon which predetermined data had been assembled. For example, images of five actresses may be presented to the player and the associated data would comprise opinion polling information as to whom the audience thought was the most attractive. The players would then play against each other to eliminate the images which they believe do not correspond to the most popular or number one response. The players would alternate until one player remained. In a second round, individual play, as opposed to play between contestants is utilized. Again, the player attempts to eliminate those answers which were other than the most popular answer of the audience.

In yet another aspect of enhanced game play, audience participation via an interactive video display, such as a computer connected over the Internet, or via an interactive television arrangement, may participate in the program.

Figure 13:
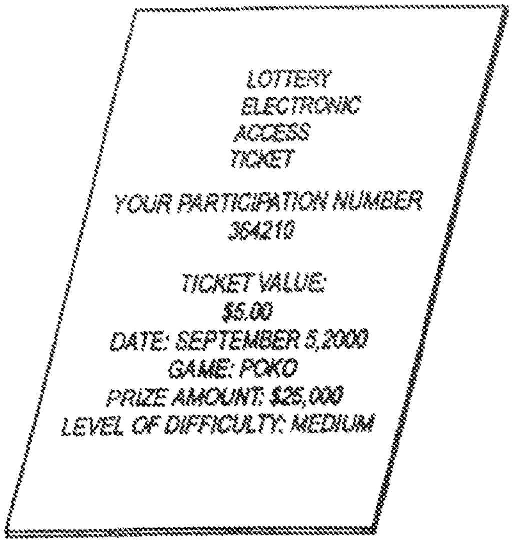
FIG. 13 shows a ticket containing a participation number.

The advent of electronic access to games has raised the serious issue of under-aged player participation. Controlling access by under-age players accessing a game over the Internet or other communication device, e.g., pager, cell phone, wireless application protocol device, SMS deuce, etc., has proved to be difficult. The inventive method and apparatus may be understood in connection with FIG. 13. A ticket comprising cardstock or other substrate or support media is provided with various printed matter. For example, the ticket may identify the various game, such as a lottery, and indicate that it is a lottery electronic access ticket. The ticket would provide a participation number, such as a pure numeric indication or alpha-numeric indication. Preferably, the ticket would have an indication of its value or purchase price. Optionally, date and time information may be provided. Having purchased the ticket, the presumably age qualified bearer of the ticket could then access the game, such as by addressing a website or by otherwise communicating with the game location. The player would be prompted or otherwise permitted to enter the participation number, such as by typing or keying it in. Game play could then proceed once the system had verified that the participation number was a valid participation number. Optionally, where the ticket is obtained from a retailer having an on-line ticket printing system, the participation number could be activated only upon the actual generation of the ticket bearing that number. If the participation number is valid, and a monetary amount remains available to the player, game play is permitted to proceed. The player is then provided with an indication of whether they have won, and if so, the amount. The monetary amount remaining on the card may be updated, such as by deducting losses or crediting wins. Optionally, the method includes the step of presenting the ticket bearing the participation number to a physical retail location, which may then access the system through its on-line connection, thereby verifying that the game play associated with the participation number is to be compensated.

In one aspect of this invention, the entertainment value of the retail purchase may be increased. For example, the tickets may contain variable information, either obscured or not obscured, regarding the electronic play. In one aspect, the amount of prize that the player can win could be presented. In the case of on-line ticket distribution, this amount would not need to be obscured, but would be obscured such as by a scratch-off strip in the case of a preprinted ticket. Yet another variable which could be utilized relates to the level of difficulty of game play. Yet another variable could be an indication of which of a plurality of games could be played by the player, e.g., POKO, LOTTO, The Zone, etc.

Figure 14:
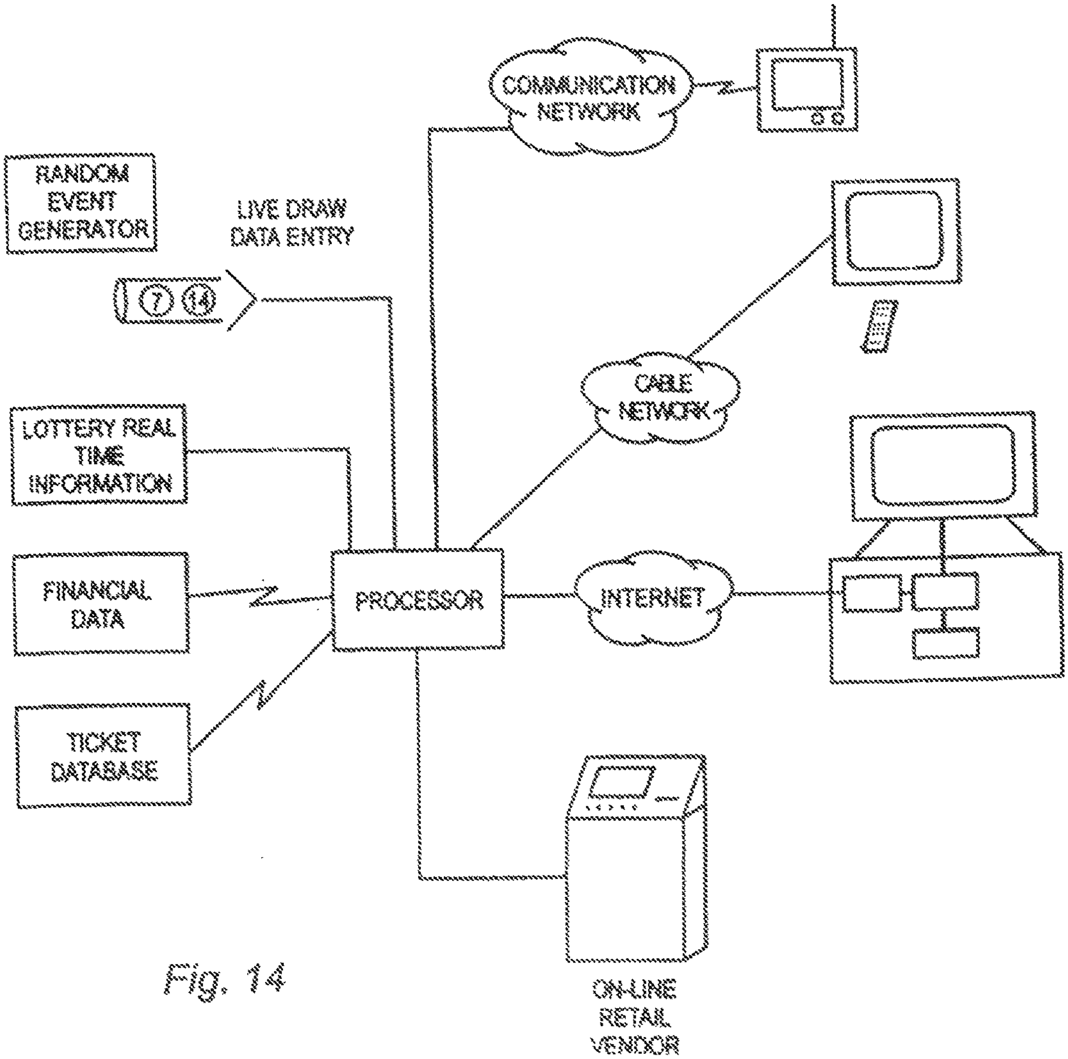
FIG. 14 shows a schematic diagram of an electronic system for implementation of these games.

FIG. 14 shows a schematic diagram of an overall system for use in performance of the games described herein. A processor is coupled to one or more players participating via an electronic communication system. For example, a player may participate through a wireless device, such as a cell phone, personal digital assistant, pager, messaging system or any portable wireless unit. Yet an alternative communication path may be through the conventional wired telephone network. Communication may alternatively be made through a cable network, such as where a computer or interactive television is provided. User input would typically be generated by a key pad, such as through a full sized key board or through a smaller sized remote input unit. In yet another mode, the Internet may be used as a communication path, typically coupling to a computer having a communication device, e.g., a modem, a microprocessor and associated storage.

The system also preferably includes a connection to a physical vending location for providing tickets. Preferably, the system includes an electronic communication between the system, e.g., the processor, and an on-line retail vendor. Preferably, the vendor possesses a ticket printing system which can print the tickets based upon input from the processor. The processor in turn potentially communicates with a number of databases. A ticket database would contain at least information regarding the tickets sold and the associated information (e.g., the numbers selected for a lottery game, the amount of value associated with a ticket purchased, the amount associated with a prize, information regarding a game to be played or the level of difficulty of the game). In order to permit real time game play, the system would have an input path permitting entry of data from a live event, such as a televised ball draw. Optionally, the system also couples to a substantially real-time lottery information system, such as the fast-track system whereby ancillary games based upon the fast-track data may be played.

In yet another aspect of this invention, the previously described games may be played either as probability games (where the outcome of the game is determined based upon the actions of the player) or as a predetermined game (where the “winning” status of a particular game play is determined prior to the player’s participation or other game play). As described previously, the game JACK-O was a probability game in that the user’s election of whether or not to draw was a factor in determining the outcome of the game. JACK-O could be implemented as a predetermined win game. The system would determine whether, and in what amount, the player would win. The system could then force that outcome, such as by presenting a certain number to the player based upon the ball draw. Thus, while game play may appear “random” to the player, the system would act in a manner so as to cause the predetermined outcome. Optionally, game play may include steps which aid in achieving the desired outcome, such as by requiring the player to draw when their tally is within a predefined number (e.g., less than 5 away) from a target number.

Figure 15A:
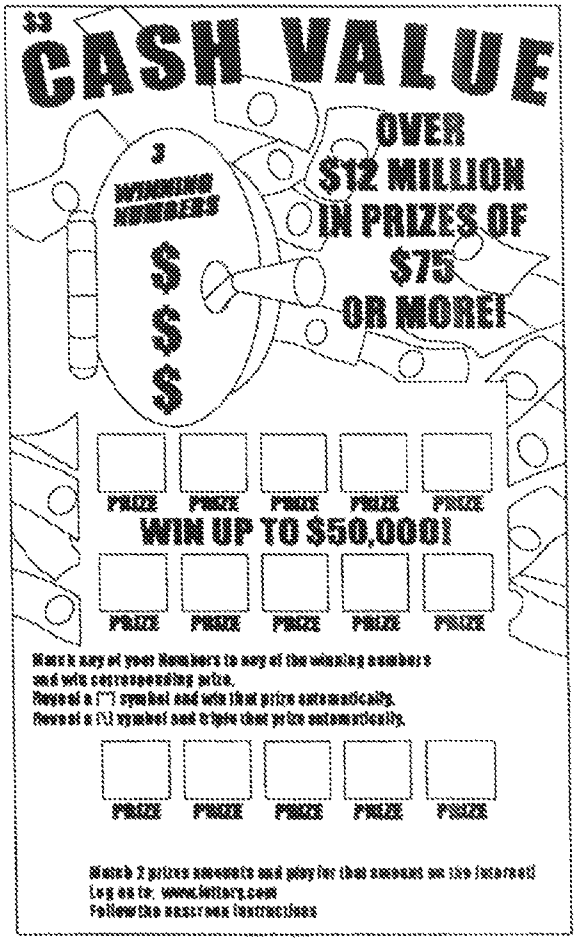
FIG. 15A shows a plan view of a lottery scratch-off ticket having separate areas for a base lottery game and a second area for a scratch-off game for entry into the electronically remote game play system.
Figure 15B:
FIG. 15B shows an expanded view of the now exposed scratch-off portion of the game play for entry into the electronically remote game play system.

FIGS. 15A and 15B show representative examples of scratch-off lottery tickets, FIG. 15A showing the overall ticket including multiple obscured areas. The central obscured area may be of a classic scratch-off lottery type ticket. The second scratch-off region relates to the electronically remote game play aspect of the system. FIG. 15B shows a blow-up of that portion, after the ticket having been scratched. As shown, the ticket includes variable information as to the potential prize amount for which the player can play in the electronically remote system. As shown, the $1,000.00 prize matches at two scratch-off locations, and accordingly, the player would be entitled to play the associated electronic game for that amount. The player is instructed on the electronic contact information, here shown to be an Internet access via a website www.lottery.com. In one aspect, the instant inventions relate to providing a lottery ticket which contains variable information about a second or auxiliary game beyond the base lottery game. The information may be variable as to the prize amount, as shown in FIG. 15B, the form of the prize (e.g., cash prize, points based prize, goods or services as a prize), the amount of the prize, or some other factor such as a multiplier of a prize amount. Another variable information component may be identification of the game to be played. For example, the scratch-off may reveal that the ticket holder is entitled to play an electronic version of POKO, HIGH-LOW, etc. Yet another variable component might constitute the degree of difficulty of game play, the level of game play at which the player can begin game play, and/or an indication of a bonus set of points or other form of advantage in game play. While one or more of these variable factors may be revealed through scratch-off of the lottery ticket, they may also be revealed solely through the electronically remote game play. For example, it may be revealed to the player that they will be playing the POKO game electronically, that the amount for which they are playing may not be revealed. Thus, in one aspect, a lottery game is augmented by having an additional game associated with it wherein at least one attribute of the second game is variable, whether as to the prize, the game to the played or the degree of difficulty of the game, all as stated previously.

Figure 16:
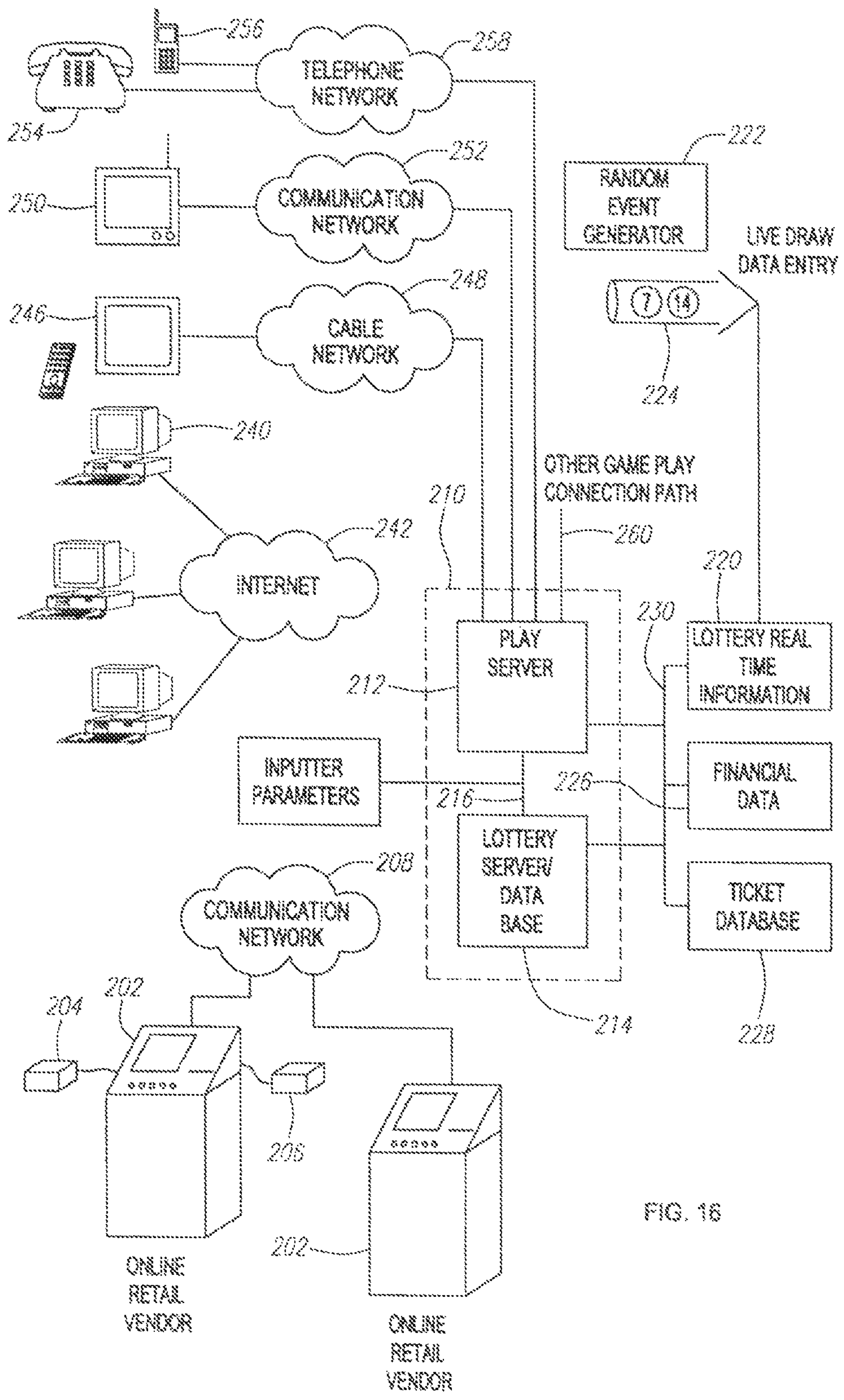
FIG. 16 is a schematic and block diagram of a system for implementation of the electronically remote game play.

FIG. 16 is a schematic and block diagram of one version of the system for implementing game play of the form described herein. Original vending of the tickets may proceed through any number of channels. For example, an online retail vendor unit 202 may be utilized when a computer generated play slip is required. Such systems may be utilized to enter a player selected number or for a quick pick operation. In the case of a scratch-off product, an online system is not necessarily required, as the vendor may merely provide the physical product to the customer. Optionally, the vending of the physical ticket product may be scanned or otherwise rotated by the vendor, and that information that the ticket has been sold may be provided to the processing system to be described, below. Alternatively, lottery kiosks may vend the tickets or other computer generated play slip. As yet another alternative, the purchase of the ticket may be made through the Internet or other electronic communication modality. As shown, the online retail vendor location system may further include printers 204 and scanning systems 206, such as a bar code scanning system. A communication network 208 interfaces the various vendor locations with the processing system 210. The processing system 210 may include various functionalities, such as the play server 212 and the lottery server 214. The play server 212 may be, for example, a web server for hosting the website accessed by the player. The lottery server 214 may be a separate server or computer which interacts with the various vendor locations. While shown as separate systems, the play server 212 and lottery server 214 may be part of the same computer or computer system 210. The particular form of implementation of the overall system may be varied as is well known to those of ordinary skill in the art. As shown, the play server 212 interfaces with the lottery server 214 over a communication path 216. The communication path 216 permits bi-directional data flow, control flow and other signal flow between the various functional parts of the computer system 210. The computer system 210 may interface with lottery real time information memory 220, such as being provided through the use of a random event generator 222 or live ball draw 224. Financial data memory 226 may contain various financial or accounting data on the players. Finally, the ticket database 228 also interfaces with the computer system 210. A bus 230 is shown interconnecting the various memory components 220, 226 and 228, further coupling to the computer system 210. The particular bus architecture may be varied to meet the system requirements as are well known to those having ordinary skill in the art. The contents of the various memory systems 226 and 228 are described in greater detail in connection with FIGS. 18A through E, 19 and 20.

The player may engage in the electronic game play through any number of modes of entry. Computers 240 may access the system via the Internet 242 or other communications network. An interactive TV system 246 may interface with the system 210 via a cable network 248. A wireless display enabled device 250 may communicate with the system 210 through a communication network 252. Any form of electronic communication enabled device may be utilized, whether wired or wireless, such as a cell phone, personal digital assistant, pager, messaging system, wireless application protocol (WAP) system, or other form of communication tool. Preferably, the system includes a graphical display capability, most preferably including the ability to display both static and dynamic images, preferably at variable degrees of resolution, ranging from low resolution to normal resolution to high resolution. FIG. 16 includes a depiction of a conventional wire line telephone 254 and a wireless phone 256 both communicating through a telephone network 258 to the computer system 210. A communication path 260 to the system 210 is provided for any other form of communication device.

Figure 17:
FIG. 17 is a depiction of a graphical user interface for use with the electronically remote game play system.

FIG. 17 shows a graphical depiction of a possible user interface in an Internet context. A field or region is provided wherein the player can enter their ticket identification number. A player may play even though not registered. However, a player may desire to be a registered user so as to participate in additional features or functionalities, such as to participate in a frequent player's club. Provision may be made in the interface to permit registration online.

FIGS. 18A through E depict various types of data fields and particular data which may be stored within the system, whether in the computer system 210 or in one of the various databases or memory systems, such as the financial data memory 226 or ticket database 228. The depiction of particular data or data fields in a given subfigure is not material, they have been separated for ease of depiction in the figure.

A ticket identification number (TIN) would be provided on the ticket possessed by the player. While the term ticket is utilized here, it will be appreciated that any form of communication of the identification number may be made, such as where the identification number is otherwise printed on a piece of paper, supplied through an electronic display or otherwise. Additionally, while one implementation includes a lottery game as the base game, the electronic remote game play of the instant inventions may be utilized with the lottery game, or completely independent of a lottery game. For example, a business wishing to run a promotional game may provide players with identification numbers for their use in the game sponsored by the business. Thus, while the term ticket identification number will be utilized herein, it will be appreciated that the identification number is the information to be utilized, and that the reference to the ticket merely references, the medium on which the particular identification number has been conveyed. As shown, the identification numbers are provided sequentially, while they need not be. The identification number may include encrypted information or may be subject to an accuracy check, such a mod 10 check or redundancy check.

The ticket identification number is then associated with one or more other data elements regarding the game play or the player. For example, in the event that variable game play as to the particular game to be played forms a part of the system, the memory would include an identification as to that game. As shown, the TIN 65432981 indicates that the HOT SEAT game will be played, whereas the game JACKO will be played for someone entering the TIN 65432982. The system also contains information regarding the prize, both in form whether monetary or non-monetary and the amount. In the case of a predefined win situation, such as in a scratch-off, the identity of the winning identification numbers is known prior to the player receiving the ticket. After the game is played, the player may optionally be provided with an authentication number which confirms their game play. Optionally, the system may request that the player confirm receipt of the acknowledgment number. Time limits may optionally be imposed upon how long the identification number remain available for play. As shown, certain of the identification numbers are subject to a last date to play limitation, whereas others are not so limited and are open. In yet another optional aspect game play through to a certain point may be required in order to reveal the prize information.

FIG. 18B continues with further possible contents of the memory. The vending merchant may be know, such as in the case of vending of a lottery ticket where the lottery system knows which TIN were sent to which merchant. A personalized retailer coupon field may be provided, such as where a promotional or cross-promotional offering is made by the system. A promotional or cross-promotional system may include a personalized retailer coupon, relating back to the vending location. For example, the game play may result in generation of a display or printable coupon which may be utilized at the vending location e.g., 7-11 as shown in FIG. 18B. Alternatively, the system may provide a promotional offer for another product or service, e.g., when you redeem your coupon receive a free Coke (or a discount thereon). Optionally, the coupon or discount may be provided electronically to the vendors general merchandise scanning and check-out system such that when the player goes to redeem their winnings and provides a TIN, the discount may be automatically applied when scanning the merchandise. Continuing with the example provided, if the TIN is associated with a 30% discount on a six-pack of Coke, that information may be provided electronically to the vendor check out system and that discount applied automatically. In certain applications, it may be desired to have a user identification and a secondary form of identification such as a PIN number or password. These may be utilized when higher levels of functionality such as a frequent player's club are utilized. Additionally, such user identification may permit the system to offer targeted discounts or offers of services or other upsells.

As shown in FIG. 18C, an optional link to other games may be provided. For example, if a player plays the lottery game, there may be a promotional game at another site to which the player may be linked. FIG. 18C continues with various additional data fields, such as the date of play and time of play. In certain instances it may be desirable to know the sequence number of contact of the game player. Such information may be utilized where the game is structured to entitle the first 1,000 plays to engage in certain game play. The final data element of FIG. 18C shows the number of plays allowed. Often times, a identification number may only be used one time, but in certain other context, there may be the desire to have a higher number of plays allowed.

Figure 20:
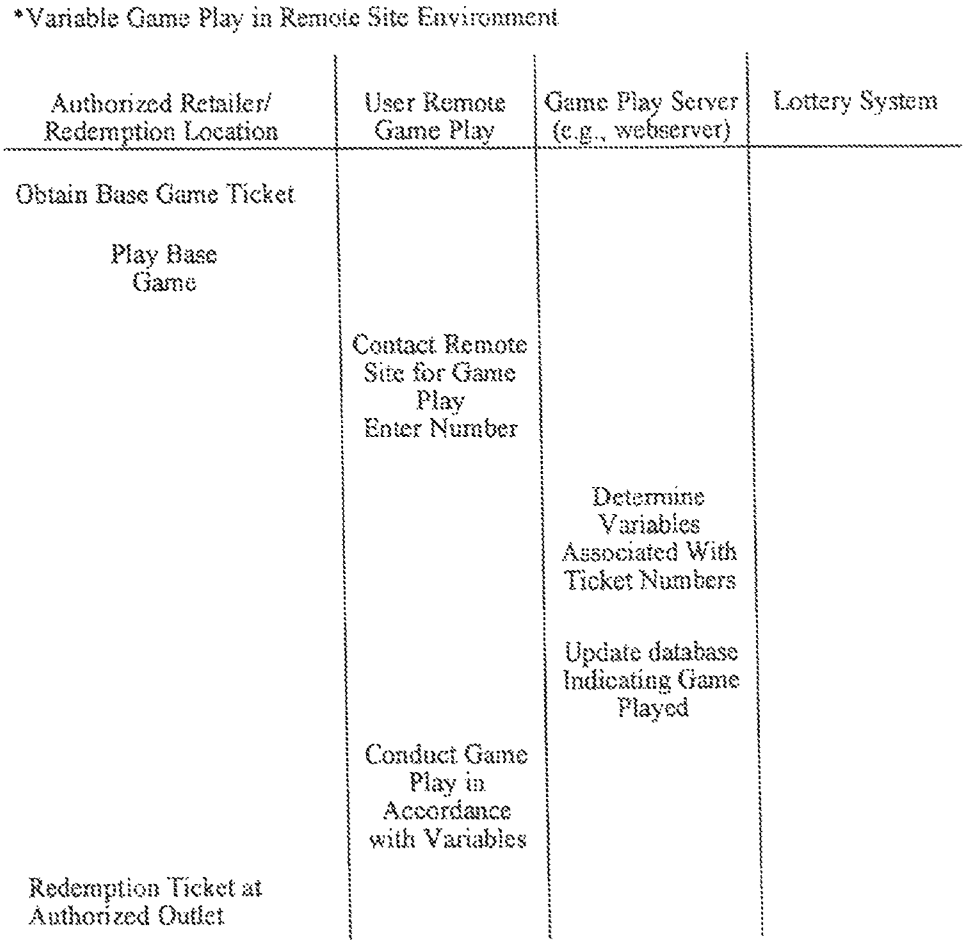
FIG. 20 is a chronological flowchart of variable game play.

FIG. 18D shows yet further data elements potential of use in the system. Optionally, the system may contain citizenship information. Various state and national lotteries are strict about geographic participation in a lottery. Thus, for example, it is often necessary for a potential player to establish a local account, such as a local bank account, or possess certain identification information such as a Social Security number or other national identification number. Through a registration process, either directly with the lottery, or via an authorized vendor, or otherwise through online registration, the player may become registered whereby they are confirmed to possess the requisite citizenship or state or national contact to satisfy the lottery requirements. Yet another data element may be the player's email address or other electronic address. In certain instances, it may be desirable to know the player's physical address, such as a home or business address. Yet further data elements relate to the frequent player aspect. One data field may indicate simply whether the person is a frequent player, and if so, the number of points they possess. As shown in FIG. 18E, the form of compensation, such as cash, airline miles or further game play. FIGS. 19 and 20 now describe certain functional aspects of possible game play in a chronological flow chart manner. The left most column identifies an action that would typically occur at an authorized retailer or redemption location. The second column indicates an action of the user or player in the remote electronic game play. The third column identifies a contact with or action at the game play server. The right hand column depicts an action or contact with the lottery system. As described in connection with FIG. 16, the actions at the game play server and the lottery system may be combined, such that those functionalities may be performed in the other column, e.g., something listed in the game play server column may be performed in the lottery system column and vice versa.

FIG. 19 shows a simplified flow diagram for game play where affirmative game play on the electronic system is required prior to redemption of the prize. A player would obtain a base game ticket at an authorized retailer. The user or player would then enter the identification number into the communication device, e.g., the Internet website. The game play serve/lottery system would then access the system memory to retrieve the stored information associated with the identification data, such as to determine whether the player wins or loses, and if they win, the amount and form of their win. The system records would be updated to indicate that game play occurred. The system would then provide the user display with an indication of whether they had won or lost, and if so, the amount. The player then would return to the authorized redemption location and provide the ticket or some indication of game play to the vendor. The vendor may then confirm the fact of game play by querying the lottery system. Upon receipt of positive confirmation of game play, the prize would be paid.

FIG. 20 shows a chronological flow for a electronic game having a variable component. Initially, the player may obtain a base game ticket from an authorized retailer. At this point, the player may play the base game. If they win, they may elect at that point to redeem their winnings. The secondary game play includes provision of the identification number. The user would then electronically provide the identification number to the game play server/lottery system. The system would then access memory utilizing the identification number to determine the variables associated with that ticket identification number. Such variables may include the prize amount, the game to be played and/or the degree of difficulty as previously explained. The system database may then be updated to indicate that the game had been played. The variable information as to the game play is then utilized to conduct game play in accordance with those variables. Ultimately, the player may redeem their winnings at an authorized outlet.

After the game play is concluded, the player may be offered a survey to fill out. Such surveys may be used to solicit personal information which may be updated in the player's individual records. Statistical processing of survey data or other game play data may be compiled by the system. In yet another variation, game play may be enabled between multiple players. Buddy lists or other association groupings may be utilized to form competitive game play pairings.

Although the foregoing invention has been described in some detail by way of illustration and example for purposes of clarity and understanding, it will be readily apparent to those of ordinary skill in the art in light of the teachings of this invention that certain changes and modifications may be made thereto without departing from the spirit or scope of the appended claims.

What is claimed:

1. A system for enhanced lottery game play adapted to couple one or more geographically remote vendors to the system, the vendors providing lottery electronic access tickets (LEAT) comprising a substrate bearing at least a participation number, the vendor locations including scanning devices, the scanning devices outputting scan information, and to couple one or more geographically remote users utilizing first electronic communication devices having first display capabilities and second electronic communication devices having second display capabilities, the first display capabilities being different than the second display capabilities, over a public communications network, including:

a lottery processor, a first communication input adapted to couple the one or more remote retail vendor locations with the lottery processor, the input including scan information from the lottery electronic access ticket (LEAT) obtained from the vendor scanning system, a second communication input adapted to couple bi-directional communications between the one or more remote users utilizing electronic communication devices with the lottery processor, a game processor, the game processor being coupled to the lottery processor, the game processor functioning at least to provide a graphical user interface for the users of the electronic communications path associated with the second communication input, the game processor selectively providing a first graphical user interface adapted for the first display capabilities of the first electronic communication devices and a second graphical user interface for the second display capabilities of the second electronic communication devices, the system including graphical display capability wherein the first graphical user interface and second graphical user interface are different responsive to the first display capabilities and second display capabilities of the communication devices, both of the first graphical user interface and second graphical user interface including a region in which the users input the participation number from the lottery electronic access ticket (LEAT) for access to the game processor, and a ticket database, the ticket database storing at least information on the participation number on the lottery electronic access ticket (LEAT) associated with lottery game play, the lottery processor placing the participation number in a first inactivated state prior to the lottery electronic access ticket being vended, the lottery processor receiving via the first communication input the scan information, and the lottery processor placing the participation number in a second activated state updating the database in response to receiving the scan information whereby the number from the lottery electronic access ticket (LEAT) is activated only upon the scanning of the ticket at the retail location.

2. The system for enhanced lottery game play of claim 1 further including a real time lottery information link to the processing system.

3. The system for enhanced lottery game play of claim 1 wherein the game processor generates a graphical user interface for on-line registration for users.

4. The system for enhanced lottery game play of claim 1 wherein the electronic communications devices include hand-held web enabled communication devices.

5. The system for enhanced lottery game play of claim 1 wherein the electronic communications devices include a wireless device.

6. The system for enhanced lottery game play of claim 1 wherein the wireless device is a wireless display enabled device.

7. The system for enhanced lottery game play of claim 6 wherein the wireless display enabled device is a cell phone.

8. The system for enhanced lottery game play of claim 6 wherein the wireless display enabled device is a personal digital assistant.

9. The system for enhanced lottery game play of claim 6 wherein the wireless display enabled device displays dynamic images.

10. The system for enhanced lottery game play of claim 1 wherein the lottery processor is accessed by one or more wireless communication paths.

11. The system for enhanced lottery game play of claim 1 wherein the lottery processor is accessed by one or more wired communication paths.

12. The system for enhanced lottery game play of claim 1 wherein the lottery processor is accessed at least by the Internet.

13. The system for enhanced lottery game play of claim 1 wherein the lottery processor is accessed by both a wireless communication path and a wired communication path.

14. The system for enhanced lottery game play of claim 1 wherein the system interfaces with an interactive television.

15. The system for enhanced lottery game play of claim 1 wherein the lottery processor and the game processor are on different computers.

16. The system for enhanced lottery game play of claim 14 wherein the lottery processor and the game processor are connected by a network.

17. The system for enhanced lottery game play of claim 1 wherein the lottery server and game server reside on the same computer.

18. The system for enhanced lottery game play of claim 1 further including a ticket.

19. The system for enhanced lottery game play of claim 18 wherein the ticket includes an identification number.

20. The system for enhanced lottery game play of claim 19 wherein the identification number is checked for entitlement for electronic game play.

21. The system for enhanced lottery game play of claim 18 wherein the ticket includes variable game play information.

22. The system for enhanced lottery game play of claim 18 wherein the ticket is a lottery ticket.

23. The system for enhanced lottery game play of claim 18 wherein the ticket includes a scratch off layer.

24. The system for enhanced lottery game play of claim 18 wherein the ticket includes bar code.

25. The system for enhanced lottery game play of claim 18 wherein the ticket includes encrypted information.

26. The system for enhanced lottery game play of claim 18 wherein the ticket includes accuracy check information.

27. The system for enhanced lottery game play of claim 1 further including a financial database linked to the system.

28. The system for enhanced lottery game play of claim 1 wherein the additional features in the graphical user interface comprise a player's club interface.

29. The system for enhanced lottery game play of claim 1 wherein the player's club includes a registration screen.

30. The system for enhanced lottery game play of claim 1 wherein a graphical user interface permits entry of the participation number of an unregistered user.

* * * * *